US012636617B2

(12) United States Patent
Steen

(10) Patent No.: US 12,636,617 B2
(45) Date of Patent: \*May 26, 2026

(54) COMPACT SPIRAL-WOUND FILTER ELEMENTS, MODULES AND SYSTEMS

(71) Applicant: EMD Millipore Corporation, Burlington, MA (US)

(72) Inventor: Jonathan Steen, Worcester, MA (US)

(73) Assignee: EMD Millipore Corporation, Burlington, MA (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/493,880

(22) Filed: Oct. 25, 2023

(65) Prior Publication Data

US 2024/0050900 A1 Feb. 15, 2024

Related U.S. Application Data

(60) Continuation of application No. 17/656,285, filed on Mar. 24, 2022, now Pat. No. 11,986,772, which is a (Continued)

(51) Int. Cl.
*B01D 61/02* (2006.01)
*B01D 61/08* (2006.01)
(Continued)

(52) U.S. Cl.
CPC ........... *B01D 63/12* (2013.01); *B01D 61/025* (2013.01); *B01D 61/145* (2013.01);
(Continued)

(58) Field of Classification Search
CPC .... B01D 63/12; B01D 63/107; B01D 63/103; B01D 61/025; B01D 61/145;
(Continued)

(56) References Cited

U.S. PATENT DOCUMENTS

| 3,540,595 A | 11/1970 | Edwards |
| 3,926,811 A | 12/1975 | Ramsteck |
| | (Continued) | |

FOREIGN PATENT DOCUMENTS

| CN | 1054379 A | 9/1991 |
| CN | 1274298 A | 11/2000 |
| | (Continued) | |

OTHER PUBLICATIONS

European Office Action received for Patent Application No. 17728414.8 mailing date Jan. 21, 2022, 4 pages.

(Continued)

*Primary Examiner* — Benjamin L Lebron
(74) *Attorney, Agent, or Firm* — EMD Millipore Corporation

(57) ABSTRACT

The present invention provides compact spiral-wound filter elements having cassette-like performance. The invention further provides filtration systems (e.g., TFF systems) and processes (e.g., SPTFF processes) employing compact spiral-wound filter elements having cassette-like performance.

15 Claims, 29 Drawing Sheets

Related U.S. Application Data continuation of application No. 16/428,189, filed on May 31, 2019, now Pat. No. 11,311,841, which is a division of application No. 14/750,838, filed on Jun. 25, 2015, now Pat. No. 10,399,039.

(60) Provisional application No. 62/017,084, filed on Jun. 25, 2014.

(51) Int. Cl.

| | |
|---|---|
| *B01D 61/14* | (2006.01) |
| *B01D 61/18* | (2006.01) |
| *B01D 63/10* | (2006.01) |
| *B01D 63/12* | (2006.01) |
| *B01D 71/68* | (2006.01) |
| *C02F 1/44* | (2023.01) |
| *D06C 15/02* | (2006.01) |
| *B01D 67/00* | (2006.01) |

(52) U.S. Cl.

CPC ......... *B01D 63/103* (2013.01); *B01D 63/107* (2022.08); *C02F 1/44* (2013.01); *C02F 1/441* (2013.01); *C02F 1/442* (2013.01); *D06C 15/02* (2013.01); *B01D 61/147* (2013.01); *B01D 67/0086* (2013.01); *B01D 71/68* (2013.01); *B01D 2313/14* (2013.01); *B01D 2313/143* (2013.01); *B01D 2313/146* (2013.01); *B01D 2315/10* (2013.01); *B01D 2315/16* (2013.01); *B01D 2317/02* (2013.01); *C02F 1/444* (2013.01)

(58) Field of Classification Search

CPC .. B01D 61/147; B01D 67/0086; B01D 71/68; B01D 2313/143; B01D 2313/146; B01D 2315/10; B01D 2315/16; B01D 2317/02; C02F 1/44; C02F 1/441; C02F 1/442; C02F 1/444; D06C 15/02

See application file for complete search history.

(56) References Cited

U.S. PATENT DOCUMENTS

| | | | |
|---|---|---|---|
| 3,931,014 | A | 1/1976 | Heimbach et al. |
| 4,028,250 | A | 6/1977 | Loft |
| 4,222,874 | A | 9/1980 | Connelly |
| 4,756,835 | A | 7/1988 | Wilson |
| 4,765,906 | A | 8/1988 | Downing et al. |
| 4,956,085 | A | 9/1990 | Kopf |
| D325,070 | S | 3/1992 | Kopf |
| 5,114,582 | A | 5/1992 | Sandstrom et al. |
| D327,313 | S | 6/1992 | Kopf |
| 5,147,542 | A | 9/1992 | Proulx |
| 5,310,688 | A | 5/1994 | Zale et al. |
| D357,059 | S | 4/1995 | Kopf |
| 5,470,468 | A | 11/1995 | Colby |
| 5,538,642 | A | 7/1996 | Solie |
| 5,599,447 | A | 2/1997 | Pearl et al. |
| 5,654,025 | A | 8/1997 | Raghunath et al. |
| 5,685,990 | A | 11/1997 | Saugmann et al. |
| 6,139,746 | A | 10/2000 | Kopf |
| 6,294,090 | B1 | 9/2001 | Nussbaumer et al. |
| 6,362,395 | B1 | 3/2002 | Poovaiah et al. |
| 6,365,395 | B1 | 4/2002 | Antoniou |
| 6,375,848 | B1 | 4/2002 | Cote et al. |
| 6,387,270 | B1 | 5/2002 | Van |
| 6,402,956 | B1 | 6/2002 | Andou et al. |
| 6,596,172 | B1 | 7/2003 | Kopf |
| 6,926,833 | B2 | 8/2005 | Van |
| 7,101,561 | B2 | 9/2006 | Maertens et al. |
| 7,384,549 | B2 | 6/2008 | De et al. |
| 7,531,632 | B2 | 5/2009 | Perreault |
| 7,682,511 | B2 | 3/2010 | De et al. |
| 7,959,805 | B2 | 6/2011 | Chisholm et al. |
| 7,967,987 | B2 | 6/2011 | De et al. |
| D651,280 | S | 12/2011 | Okawa et al. |
| D655,779 | S | 3/2012 | Honda et al. |
| D655,780 | S | 3/2012 | Honda et al. |
| 8,157,999 | B2 | 4/2012 | De et al. |
| 8,231,787 | B2 | 7/2012 | Mir et al. |
| 8,506,802 | B1 | 8/2013 | De |
| 8,728,315 | B2 | 5/2014 | De Los Reyes et al. |
| 8,747,669 | B1 | 6/2014 | Bonner et al. |
| D711,500 | S | 8/2014 | Marchetti |
| 8,815,583 | B2 | 8/2014 | Miller et al. |
| 8,991,027 | B2 | 3/2015 | Jons et al. |
| D729,897 | S | 5/2015 | Ledbetter et al. |
| 9,133,433 | B2 | 9/2015 | Vogel et al. |
| D741,983 | S | 10/2015 | Mueller et al. |
| D761,381 | S | 7/2016 | Natale et al. |
| D762,811 | S | 8/2016 | Natale et al. |
| D811,519 | S | 2/2018 | Natale et al. |
| 10,195,550 | B2 | 2/2019 | Steen et al. |
| 10,207,225 | B2 | 2/2019 | Lutz et al. |
| 10,350,518 | B2 | 7/2019 | Steen et al. |
| D857,839 | S | 8/2019 | Natale et al. |
| 10,399,039 | B2 | 9/2019 | Steen |
| 10,550,148 | B2 | 2/2020 | Natarajan et al. |
| D912,765 | S | 3/2021 | Natale et al. |
| 11,033,839 | B2 | 6/2021 | Steen et al. |
| 11,033,939 | B2 | 6/2021 | Hengen |
| 11,040,310 | B2 | 6/2021 | Lutz et al. |
| 11,278,827 | B2 | 3/2022 | Steen et al. |
| 11,311,841 | B2 | 4/2022 | Steen et al. |
| 11,617,988 | B2 | 4/2023 | Lutz et al. |
| 11,679,349 | B2 | 6/2023 | Steen et al. |
| 11,986,772 | B2 | 5/2024 | Steen |
| 2002/0170859 | A1 | 11/2002 | Kopf |
| 2002/0177693 | A1 | 11/2002 | Lebing et al. |
| 2003/0066794 | A1 | 4/2003 | Diel |
| 2003/0111402 | A1 | 6/2003 | Baig et al. |
| 2004/0167320 | A1 | 8/2004 | Couto et al. |
| 2005/0184008 | A1 | 8/2005 | Schacht et al. |
| 2005/0197496 | A1 | 9/2005 | Perreault |
| 2005/0218057 | A1 | 10/2005 | Ngee |
| 2006/0051347 | A1 | 3/2006 | Winter |
| 2006/0144788 | A1 | 7/2006 | Cath et al. |
| 2006/0219635 | A1 | 10/2006 | Mccague et al. |
| 2006/0292672 | A1 | 12/2006 | Miller et al. |
| 2007/0138082 | A1 | 6/2007 | Connors, Jr. et al. |
| 2007/0151924 | A1 | 7/2007 | Mir et al. |
| 2007/0151925 | A1 | 7/2007 | De et al. |
| 2007/0173638 | A1 | 7/2007 | Buchacher et al. |
| 2007/0246406 | A1 | 10/2007 | Dibel et al. |
| 2008/0087594 | A1 | 4/2008 | Hermann et al. |
| 2008/0087595 | A1 | 4/2008 | Hermann |
| 2008/0105038 | A1* | 5/2008 | Jons ...................... B01D 63/12 73/38 |
| 2008/0135500 | A1 | 6/2008 | Gagnon et al. |
| 2008/0190836 | A1 | 8/2008 | Beppu et al. |
| 2008/0202242 | A1 | 8/2008 | Mickols et al. |
| 2009/0145838 | A1 | 6/2009 | Knappe et al. |
| 2009/0214522 | A1 | 8/2009 | Winter |
| 2009/0221047 | A1 | 9/2009 | Schindler et al. |
| 2009/0266756 | A1 | 10/2009 | Fischer-fruehholz et al. |
| 2010/0006495 | A1 | 1/2010 | Buschmann |
| 2010/0111378 | A1 | 5/2010 | Kwan |
| 2010/0192976 | A1 | 8/2010 | Lee et al. |
| 2011/0005984 | A1 | 1/2011 | Boettcher et al. |
| 2011/0309018 | A1 | 12/2011 | Kopf et al. |
| 2012/0077963 | A1 | 3/2012 | Hongo et al. |
| 2012/0122076 | A1 | 5/2012 | Lau et al. |
| 2012/0160758 | A1 | 6/2012 | Beauchamp et al. |
| 2012/0166332 | A1 | 6/2012 | Naaman |
| 2012/0168368 | A1 | 7/2012 | De et al. |
| 2012/0264948 | A1 | 10/2012 | Hilbert et al. |
| 2012/0298578 | A1 | 11/2012 | Herrington et al. |
| 2012/0316323 | A1 | 12/2012 | Nardini et al. |
| 2013/0037486 | A1 | 2/2013 | Sayer et al. |
| 2013/0098829 | A1 | 4/2013 | Dontula et al. |
| 2013/0101797 | A1 | 4/2013 | Dontula et al. |
| 2013/0146531 | A1 | 6/2013 | Tayalia et al. |

(56) References Cited

U.S. PATENT DOCUMENTS

| | | |
|---|---|---|
| 2013/0334128 A1 | 12/2013 | Takagi et al. |
| 2014/0048483 A1 | 2/2014 | Maeda et al. |
| 2014/0130963 A1 | 5/2014 | Jons et al. |
| 2014/0231331 A1 | 8/2014 | De Los Reyes et al. |
| 2014/0251896 A1 | 9/2014 | Hirozawa et al. |
| 2015/0093800 A1 | 4/2015 | Mahajan et al. |
| 2015/0144560 A1 | 5/2015 | Taniguchi et al. |
| 2015/0360180 A1 | 12/2015 | Lutz et al. |
| 2015/0361129 A1 | 12/2015 | Natarajan et al. |
| 2015/0375173 A1 | 12/2015 | Steen |
| 2016/0059159 A1 | 3/2016 | Steen et al. |
| 2016/0059160 A1 | 3/2016 | Steen et al. |
| 2016/0090514 A1 | 3/2016 | Wang et al. |
| 2017/0056825 A1 | 3/2017 | Schwan et al. |
| 2017/0157566 A1 | 6/2017 | Gefroh et al. |
| 2018/0078903 A1 | 3/2018 | Hillier |
| 2019/0099702 A1 | 4/2019 | Steen et al. |
| 2019/0099716 A1 | 4/2019 | Lutz et al. |
| 2019/0099717 A1 | 4/2019 | Lutz et al. |
| 2019/0134569 A1 | 5/2019 | Steen |
| 2019/0153027 A1 | 5/2019 | Natarajan et al. |
| 2019/0282937 A1 | 9/2019 | Steen et al. |
| 2019/0282963 A1 | 9/2019 | Steen |
| 2020/0246761 A1 | 8/2020 | Wohlleben et al. |
| 2020/0368646 A1 | 11/2020 | Salbaum et al. |
| 2021/0016520 A1 | 1/2021 | Mayes et al. |
| 2021/0123551 A1 | 4/2021 | Kuhn De Chizelle et al. |
| 2022/0176278 A1 | 6/2022 | Steen et al. |
| 2022/0212146 A1 | 7/2022 | Steen et al. |
| 2025/0236641 A1 | 7/2025 | Natarajan et al. |

FOREIGN PATENT DOCUMENTS

| | | |
|---|---|---|
| CN | 103429308 A | 12/2013 |
| CN | 105435504 A | 3/2016 |
| EP | 0307047 A1 | 3/1989 |
| EP | 0613724 A2 | 9/1994 |
| EP | 1029583 A1 | 8/2000 |
| EP | 1707254 A1 | 10/2006 |
| EP | 1944076 A1 | 7/2008 |
| EP | 1974801 A2 | 10/2008 |
| EP | 2067522 A1 | 6/2009 |
| EP | 2119492 A1 | 11/2009 |
| EP | 2682168 A1 | 1/2014 |
| EP | 2703066 A1 | 3/2014 |
| EP | 2735357 A1 | 5/2014 |
| EP | 2957336 A3 | 3/2016 |
| EP | 3527282 A1 | 8/2019 |
| JP | S54-149384 A | 11/1979 |
| JP | S55-109407 A | 8/1980 |
| JP | H01-159006 A | 6/1989 |
| JP | H05-51435 U | 7/1993 |
| JP | 2000-288541 A | 10/2000 |
| JP | 2001-252543 A | 9/2001 |
| JP | 2006-247453 A | 9/2006 |
| JP | 2007-117949 A | 5/2007 |
| JP | 2008-023415 A | 2/2008 |
| JP | 2009-178915 A | 8/2009 |
| JP | 2010-053154 A | 3/2010 |
| JP | 2013-240765 A | 12/2013 |
| JP | 5606615 B1 | 10/2014 |
| JP | 2015-009182 A | 1/2015 |
| JP | 2015-107467 A | 6/2015 |
| KR | 30-0646879 S | 5/2012 |
| KR | 2017-0135567 A | 12/2017 |
| WO | 91/11249 A1 | 8/1991 |
| WO | 2000/048703 A1 | 8/2000 |
| WO | 2005/054287 A1 | 6/2005 |
| WO | 2006/105555 A1 | 10/2006 |
| WO | 2007/076496 A2 | 7/2007 |
| WO | 2007/076497 A2 | 7/2007 |
| WO | 2009/035700 A2 | 3/2009 |
| WO | 2009/064797 A2 | 5/2009 |
| WO | 2011/094236 A2 | 8/2011 |
| WO | 2012/039675 A1 | 3/2012 |
| WO | 2012/091027 A1 | 7/2012 |
| WO | 2013/047744 A1 | 4/2013 |
| WO | 2013/047746 A1 | 4/2013 |
| WO | 2013/085755 A2 | 6/2013 |
| WO | 2013/106337 A1 | 7/2013 |
| WO | 2013/125505 A1 | 8/2013 |
| WO | 2014/067898 A1 | 5/2014 |
| WO | 2015/133972 A1 | 9/2015 |
| WO | 2015/195452 A2 | 12/2015 |
| WO | 2015/195453 A2 | 12/2015 |
| WO | 2015/200691 A1 | 12/2015 |
| WO | 2016/033546 A1 | 3/2016 |
| WO | 2016/033553 A1 | 3/2016 |
| WO | 2017/213892 A1 | 12/2017 |

OTHER PUBLICATIONS

European Office Action received for Patent Application No. 20167074.2 mailing date Mar. 25, 2022, 4 pages.
Extended European Search Report received for EP Application No. 15172144.6 mailing date Nov. 20, 2015, 20 pages.
Extended European Search Report received for European Patent Application No. 19163829.5, mailing date Jul. 24, 2019, 17 pages.
Extended European Search Report received for European Patent Application No. 20167074.2, mailing date Jun. 16, 2020, 18 pages.
Final Office Action received for U.S. Appl. No. 14/736,646, mailing date Sep. 7, 2017, 8 pages.
Final Office Action received for U.S. Appl. No. 16/259,489 mailing date Mar. 22, 2022, 12 pages.
International Search Report and Written Opinion for International Application No. PCT/US2015/037780 mailing date Sep. 7, 2015, 12 pages.
International Search Report and Written Opinion for PCT Application No. PCT/US2015/035250 mailing date Dec. 14, 2015, 23 pages.
International Search Report and Written Opinion for PCT Application No. PCT/US2015/035251 mailing date Dec. 18, 2015, 15 pages.
International Search Report and Written Opinion for PCT Application No. PCT/US2017/034709 mailing date Aug. 3, 2017, 10 pages.
International Search Report and Written Opinion for PCT Application No. PCT/US2015/047574 mailing date Dec. 7, 2015, 10 pages.
International Search Report and Written Opinion received for PCT Patent Application No. PCT/US2015/047585, mailing date Dec. 7, 2015, 9 pages.
Membrane operations, Separation Processes, Retrieved from Internet URL:<https://web.archive.org/web/20041113003913/http://www.separationprocesses.com/Membrane/MT_Chp05j.htm>, Nov. 13, 2004, pp. 1-2.
Non-Final Office Action received for U.S. Appl. No. 14/736,596, mailing date Jun. 4, 2018, 11 pages.
Non-Final Office Action received for U.S. Appl. No. 14/736,646, mailing date Feb. 17, 2017, 7 Pages.
Non-Final Office Action received for U.S. Appl. No. 14/750,838, mailing date Jan. 27, 2017.
Non-Final Office Action received for U.S. Appl. No. 14/839,852, mailing date Jul. 19, 2017.
Notice of Allowance for U.S. Appl. No. 29/512,358, "Diverter Plate", mailing date Dec. 9, 2015, Jun. 4, 2019.
Notice of Allowance for U.S. Appl. No. 29/633,223, titled "Retentate Plate", mailing date Apr. 25, 2019.
Notice of Allowance received for U.S. Appl. No. 14/736,596, mailing date Oct. 15, 2018, 11 pages.
Notice of Allowance received for U.S. Appl. No. 14/736,646, mailing date Oct. 23, 2018, 8 pages.
Notice of Allowance received for U.S. Appl. No. 14/839,852, mailing date Mar. 14, 2019, 8 pages.
Notice of Allowance received for U.S. Appl. No. 29/512,353, mailing date Mar. 1, 2016, 5 pages.
Notice of Allowance received for U.S. Appl. No. 29/569,589, mailing date Nov. 15, 2017, 5 pages.

(56) References Cited

OTHER PUBLICATIONS

Notification Concerning Transmittal of International Preliminary Report on Patentability for International Application No. PCT/US2015/037780, mailing date Jan. 5, 2017, Jan. 5, 2017.

Notification Concerning Transmittal of International Preliminary Report on Patentability for International Application No. PCT/US2015/047585, mailing date Mar. 9, 2017, Mar. 9, 2017.

Office Action for Canadian Patent Application No. 2,796,117 mailing date Apr. 10, 2017.

Partial European Search Report received for EP Application No. 15172146.1 mailing date Nov. 6, 2015, 8 pages.

Search Report received for Chinese Patent Application No. 201510335030.2, mailing date Jun. 26, 2017.

Search Report received for Chinese Patent Application No. 201580000755.4, mailing date Mar. 24, 2017.

Singapore Search Report for SG Application No. 10201504670R, Titled "Methodology For Increasing The Capacity Of Flow-Through Processes", issued on Nov. 16, 2017.

Written Opinion received for Singapore Application No. 10201504674T, mailing date Apr. 12, 2019.

Office Action received for Singaporean Patent Application No. 10202006102U mailing date Jul. 3, 2023, 5 Pages.

Non-Final Office Action received for U.S. Appl. No. 14/736,646, mailing date Mar. 15, 2018, 6 pages.

Final Office Action received for U.S. Appl. No. 14/839,779, mailing date Nov. 24, 2017, 8 pages.

Non Final Office Action received for U.S. Appl. No. 14/839,779, mailing date Apr. 2, 2018, 10 pages., Apr. 2, 2018, 10 pages.

Non-Final Office Action received for U.S. Appl. No. 14/839,779, mailing date Jul. 20, 2017, 7 Pages.

Notice of Allowance received for U.S. Appl. No. 14/839,779, mailing date Oct. 24, 2018, 7 pages., Oct. 24, 2018, 7 pages.

Non-Final Office Action received for U.S. Appl. No. 14/839,852, mailing date Feb. 13, 2018, 5 pages.

Non-Final Office Action received for U.S. Appl. No. 14/839,852, mailing date Jul. 27, 2018, 8 pages.

Non Final Office Action Received for U.S. Appl. No. 16/096,516, mailing date Jul. 21, 2022, 14 Pages.

Appeal Decision received for U.S. Appl. No. 16/207,874, mailing date Jun. 1, 2022, 7 Pages.

Notice of Allowance received for U.S. Appl. No. 16/207,874, mailing date Jan. 17, 2023, 5 Pages.

Notice of Allowance received for U.S. Appl. No. 16/207,874, mailing date Feb. 27, 2023, 2 Pages.

Notice of Allowance received for U.S. Appl. No. 16/207,874, mailing date Sep. 7, 2022, 5 Pages.

Final Office Action Received for U.S. Appl. No. 16/259,489, mailing date May 16, 2023, 15 Pages.

Non Final Office Action Received for U.S. Appl. No. 16/259,489, mailing date Oct. 26, 2022, 18 Pages.

Non Final Office Action Received for U.S. Appl. No. 17/315,721 mailing date Oct. 14, 2022, 6 Pages.

Notice of Allowance received for U.S. Appl. No. 17/315,721, mailing date Feb. 17, 2023, 5 Pages.

Non Final Office Action Received for U.S. Appl. No. 16/259,489, mailing date Jul. 26, 2024, 18 Pages.

International Preliminary Report on Patentability received for PCT Application No. PCT/US2015/047585 mailing date Mar. 9, 2017, 7 Pages.

Non-Final Office Action Received for U.S. Appl. No. 17/682,221, mailing date Aug. 14, 2024, 10 pages.

Final Office Action Received for U.S. Appl. No. 16/259,489, mailing date Feb. 29, 2024, 15 Pages.

Notice of Allowance received for U.S. Appl. No. 17/656,285, mailing date Feb. 21, 2024, 8 Pages.

Office Action received for Chinese Patent Application No. 202210363469.6 mailing date Mar. 30, 2024, 7 Pages (4 Pages of English Translation & 3 Pages of Official copy).

Office Action received for Chinese Patent Application No. 202211266108.6 mailing date Jan. 31, 2024, 16 Pages (9 Pages of English translation and 7 Pages of official copy).

Office Action received for Chinese Patent Application No. 202211266108.6 mailing date May 7, 2024, 12 Pages (5 Pages of English Translation & 7 Pages of Official Copy).

Notice of Allowance received for U.S. Appl. No. 17/315,721, mailing date Mar. 2, 2023, 2 Pages.

Final Office Action Received for U.S. Appl. No. 17/656,285, mailing date Mar. 3, 2023, 17 Pages.

Non Final Office Action Received for U.S. Appl. No. 17/656,285, mailing date Oct. 14, 2022, 15 Pages.

Notice of Allowance received for U.S. Appl. No. 17/656,285, mailing date Aug. 2, 2023, 9 Pages.

Search Report for Chinese Patent Application No. 201580000755.4 mailing date Oct. 27, 2016, Oct. 27, 2016.

Office Action received for Japanese Patent Application No. 2020-081059 mailing date Mar. 29, 2022, 6 Pages (3 Pages of English Translation & 3 Pages of Official Copy).

Office Action received for Japanese Patent Application No. 2022-120234 mailing date Sep. 5, 2023, 5 Pages (2 Page of English translation and 3 pages of official copy).

Extended European Search Report received for European Patent Application No. 22174654.8 mailing date Aug. 3, 2022, 12 Pages.

Extended European Search Report received for European Patent Application No. 22200930.0, mailing date Feb. 3, 2023, 11 Pages.

Casey et al., "Cadence Single-pass TFF Coupled with Chromatography Steps Enables Continuous Bioprocessing while Reducing Processing Times and Volumes", PALL, Life Science, Dec. 8, 2015, 8 pages.

Casey et al., "Protein Concentration with Single-Pass Tangential Flow Filtration (SPTFF)", Journal of Membrane Science vol. 384 (1), Sep. 10, 2011, pp. 82-88.

Choo et al., "Membrane fouling mechanisms in the membrane-coupled anaerobic bioreactor", Water Research, vol. 30 No. 8, Aug. 1996, pp. 1771-1780.

Dizon-Maspat et al., "Single Pass Tangential Flow Filtration to Debottleneck Downstream Processing for Therapeutic Antibody Production", Biotechnology and Bioengineering, vol. 109 (4), Nov. 17, 2011, pp. 962-970.

Hu, "Ion Exchange Adsorption and Membrane Filtration Hybrid Process for Protein Mixture Separation", Journal of Chemical Engineering of Japan vol. 39(12), 2006, pp. 1283-1290.

Internet Blog, "Tangential Flow Filtration", Apr. 26, 2006, 3 pages.

Liu et al., "Recovery And Purification Process Development For Monoclonal Antibody Production", MAbs vol. 2 (5), Sep. 1, 2010, pp. 480-499.

Lutz, Herb, "Ultrafiltration for Bioprocessing", 2015, pp. 77-94.

Mehta, Ushma, "ChromaSorb™ Single-Use Membrane-Based Anion Exchanger", BioProcess International, Available online at: <https://bioprocessintl.com/2009/chromasorb-single-use-membrane-based-anion-exchanger-206589/>, 2009, 2 pages.

Merry, A.J., "Membrane Equipment and Plant Design", Industrial Membrane Separation Technology, 1996, pp. 32-66.

Middlewood et al., "Extraction of Amaranth Starch from an Aqueous Medium using Microfiltration: Membrane Fouling and Cleaning", Journal of Membrane Science, vol. 411-412, Apr. 12, 2012, pp. 22-29.

Millipore Bioprocess Division, "Maintenance Procedures Pellicon and Pellicon 2 Cassette Filters", Jul. 1998, 20 pages.

Pall Corporation Brochure, "Cadence Single-Pass Tangential Flow Filtration Modules and Systems", 2014, 5 pages.

International Preliminary Report on Patentability received for PCT Application No. PCT/US2015/037780, mailing date Jan. 5, 2017, 10 pages., Jan. 5, 2017, 10 pages.

International Preliminary Report on Patentability for Int'l Application No. PCT/US17/34709 mailing date Dec. 20, 2018, 7 pages., Dec. 20, 2018, 7 pages.

Notification Concerning Transmittal of International Preliminary Report on Patentability for International Application No. PCT/US2015/035250 mailing date Dec. 29, 2016, Dec. 29, 2016.

(56)        References Cited

OTHER PUBLICATIONS

International Preliminary Report on Patentability for PCT Application No. PCT/US2015/035251 mailing date Dec. 29, 2016, Dec. 29, 2016.

Notification Concerning Transmittal of International Preliminary Report on Patentability for International Application No. PCT/US2015/035251, mailing date Dec. 29, 2016.

Notification Concerning Transmittal of International Preliminary Report on Patentability for International Application No. PCT/US2015/047574,, "Single Pass Tangential Flow Filtration Systems And Tangential Flow Filtration Systems With Recirculation of Retentate"., Mar. 9, 2017.

Pellicon,"Pellicon Single-Pass TFF Cassette Retentate Collection Plate", Available online at: <https://www.emdmillipore.com/US/en/product/Pellicon-Single-Pass-TFF-Cassette-Retentate-Collection-Plate, MM_NF-XXSPTFF03>, 2 pages.

Rathore et al., "Recent Developments in Membrane-Based Separations In Biotechnology Processes: Review", Preparative Biochemistry and Biotechnology, vol. 41 (4), Oct. 2011, pp. 398-421.

Reis et al., "Linear Scale Ultrafiltration", Biotechnology and Bioengineering, vol. 55 (5), Sep. 5, 1997, pp. 737-746.

Schwartz, Larry, "Diafiltration for Desalting or Buffer Exchange", BioProcess International, Available online at: <http://www.bioprocessintl.com/wp-content/uploads/bpi-content/0105ar06_77637a.pdf>, May 2003, 6 pages.

Steen et al., "Single Pass Tangential Flow Filtration", ACS mtg. poster, Anaheim, CA, Mar. 2011, 1 page.

Teske et al., "Inline Ultrafiltration", Biotechnology Progress, American chemical Society, vol. 26 (4), Mar. 1, 2010, pp. 1068-1072.

Zou et al., "New Technologies for high concentration protein ultrafiltration: High Viscosity TFF Cassettes and Single-Pass TFF", EMD Millipore, Oct. 2014, 1 page.

TFF system improves recovery and increases yield, Pall Corporation, Membrane Technology, vol. 2010, No. 5, May 2010, pp. 2-3.

Communication pursuant to Article 94(3) EPC received for European Patent Application No. 22195919.0 mailing date Dec. 6, 2023, 11 Pages.

Extended European Search Report received for European Patent Application No. 22195919.0 mailing date Dec. 14, 2022, 28 Pages.

* cited by examiner

| Commercial Devices | | | Feed Screen | | | | Permeate Screen | | | | Feed <SB | Permeate <SB |
|---|---|---|---|---|---|---|---|---|---|---|---|---|
| | | | um ht | weave | SPI | Wid* | um ht | weave | SPI | Lgm* | <SB | <SB |
| Cassette | EMD Millipore | P3B030A01 | 420 | 2/1 RH TW | 51x51 | 6 | 320 | 2/1 RH TW | 70x70 | 3.6 | No | No |
| Spiral | Alfa Laval | UF-pHt | 762 | | | 17-33 | | | | | No | |
| Spiral | EMD Millipore | Prep/Scale | 500 | 1/1 Sefar | 33x33 | 12 | 508 | BiPlanar | 32.5x32.5 | 33 | Yes | Yes |
| Spiral | EMD Millipore | Amicon S40 | 864 | Vexar | 9 | 12 | 280 | Tricot | n/a | 27+/-0.5 | No | No |
| Spiral | EMD Millipore | Helicon SS30 | 711 | Vexar | 11 to 12 | 26+/-0.25 | 420 | 2/1 RH TW | 51 x 51 | 25.5+/-0.3 | No | Yes |
| Spiral | invention | | 420 | 2/1 RH TW | 51x51 | 12 | 280 | Tricot | n/a | 16 | Yes | Yes |
| Spiral | invention | | 340 | 2/1 RH TW | 51x51 | 6 | 280 | Tricot | n/a | 16 | Yes | Yes |

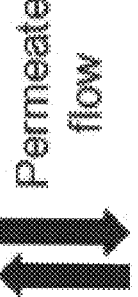
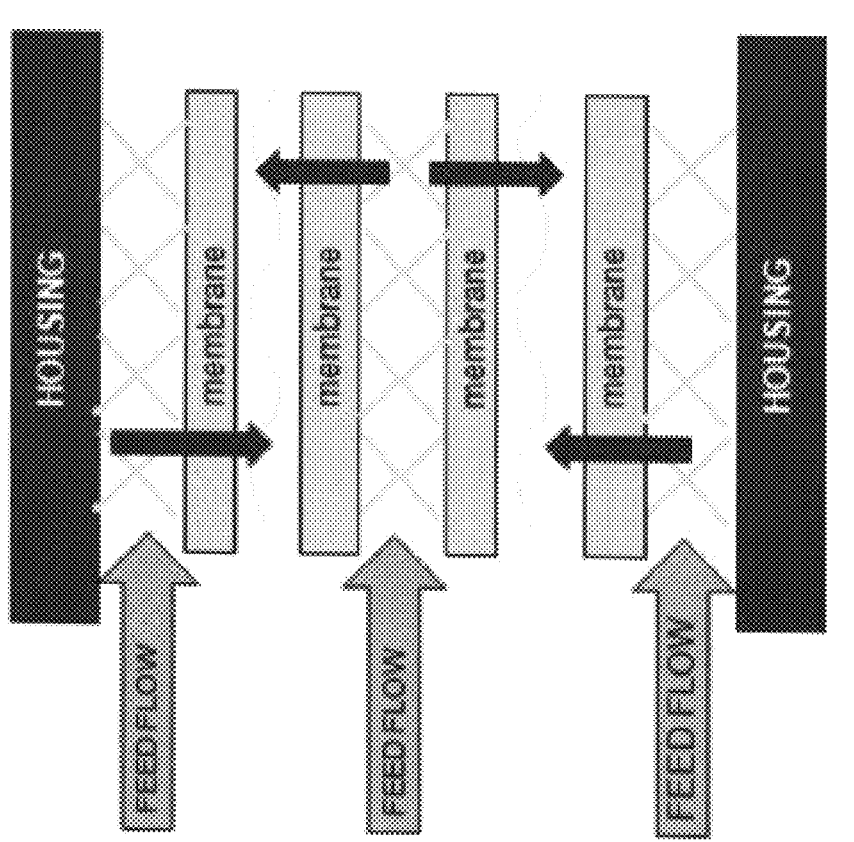
FIG. 14

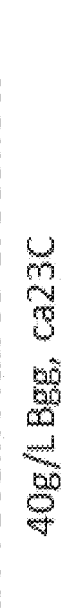
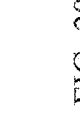
FIG. 20

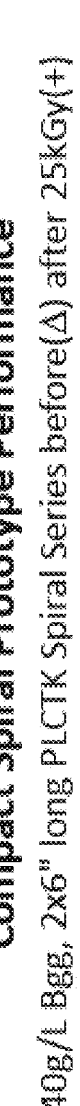
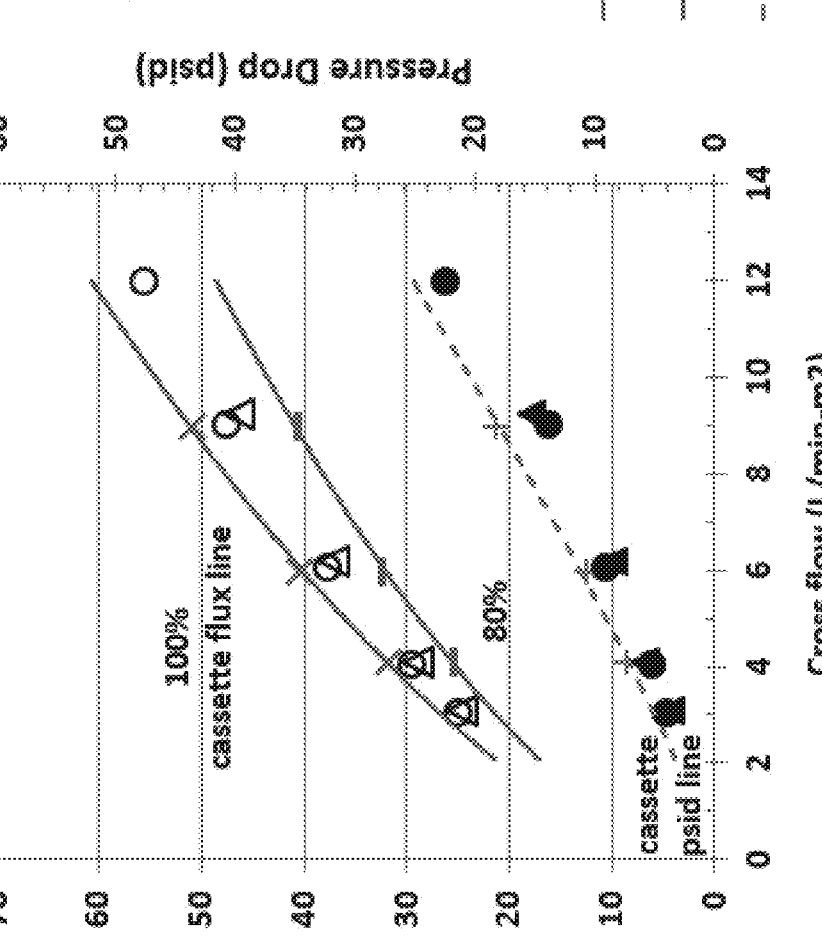
FIG. 29

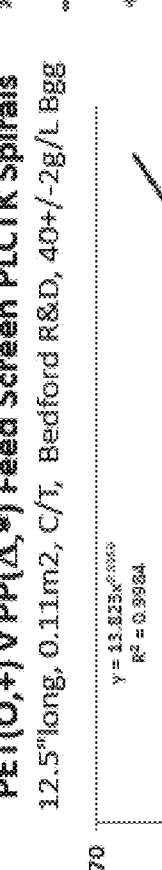
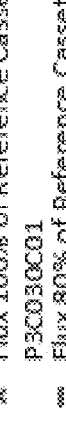
FIG. 32

COMPACT SPIRAL-WOUND FILTER ELEMENTS, MODULES AND SYSTEMS

RELATED APPLICATIONS

This application is a continuation of U.S. application Ser. No. 17/656,285, filed Mar. 24, 2022, which is a continuation of U.S. application Ser. No. 16/428,189, filed May 31, 2019, issued as U.S. Pat. No. 11,311,841 on Apr. 26, 2022, which is a divisional of U.S. application Ser. No. 14/750,838, filed Jun. 25, 2015, issued as U.S. Pat. No. 10,399,039 on Sep. 3, 2019, which claims the benefit of U.S. Provisional Application No. 62/017,084, filed on Jun. 25, 2014. The entire contents of the above applications are incorporated herein by reference.

BACKGROUND

Biopharmaceutical filtration systems often utilize cassette filters for the ultrafiltration and diafiltration of macromolecules, such as monoclonal antibodies. Cassette filters, such as high mass transfer versions of Pellicon® 3 cassettes (EMD Millipore Corp., Billerica, MA), serve as the standard for desired system performance due to their compactness, high mass transfer rate, low cross flow requirements and acceptably low pressure drop. However, cassette filters must be run in compression holder assemblies, which typically consist of thick stainless steel holder plates and alignment rods. Compression is applied to the filters by tightening nuts or energizing hydraulic pistons. For single use applications, the cassettes are typically isolated from the expensive housing assemblies to prevent the housing assemblies from coming into contact with process fluids. Such isolation is achieved through the use of liner plates or plastic jackets encapsulating the cassettes. Both the housing assemblies and liner plates/plastic jackets are inconvenient to use and increase the cost and complexity of filtration systems.

Spiral-wound membrane modules are an attractive alternative to cassette filters because they obviate the need for compression holder assemblies. However, conventional spiral-wound membrane elements have much lower flux than cassette filters, and would require impractically large pumps or long filtration flow paths to achieve similar flux as cassette filters at the same cross flow rate, resulting in a system that is neither compact, nor easy to use. Accordingly, there is a need for efficient, compact, scalable and improved spiral-wound filter elements and elements that provide the performance advantages of cassette filters.

SUMMARY

The present invention is based, in part, on improved spiral-wound filter elements that provide the performance attributes of cassette filters. Accordingly, in one embodiment the present invention relates to a spiral-wound filter element having a permeate flux of at least about 70% of the mass transfer limited permeate flux of a reference cassette filter operating at the same cross flow flux and a feed channel pressure drop of no more than about 1.2 times the feed channel pressure drop of the reference cassette filter operating at the same cross flow flux. In other embodiments, the permeate flux is at least about 80% or 90% of the mass transfer limited permeate flux of the reference cassette filter. In further embodiments, a spiral-wound filter element has a feed channel length of about 6 inches (15.24 cm) to about 18 inches (45.72 cm). In a particular embodiment, a spiral-wound filter element has a feed channel length of about 12.5 inches (31.75 cm) or less.

In another embodiment, the present invention relates to a TFF system that includes at least one spiral-wound filter element of the invention. In a particular embodiment, the TFF system can be operated in a single-pass mode. In some embodiments, two or more spiral-wound filter elements that are fluidly connected in series or in parallel can be included in the TFF system. The TFF system can generally include a valve or flow meter that is positioned on a retentate outlet or conduit carrying retentate from the system to a retentate container to control an amount of retentate that is recirculated. The TFF system can also include a reservoir for diafiltration solution and a conduit for delivering diafiltration to the feed reservoir.

In a further embodiment, the present invention relates to a process for filtering a liquid feed that includes passing a liquid feed through at least one spiral-wound filter element described of the invention, separating the liquid feed into permeate and retentate in the filter element, and recovering the permeate and at least a portion of the retentate from the filter element. The process can be a tangential flow filtration (TFF) process (e.g., a single-pass TFF (SPTFF) process). In certain embodiments, the liquid feed can be passed through at least two spiral-wound filter elements of the invention that are fluidly connected in the TFF system. A portion of the retentate, including about 10% or less of the retentante, can be recirculated through the at least one of the filter elements. The process can further include a diafiltration step, which includes concentration and dilution steps.

In another embodiment, the present invention relates to a method of producing a high turbulence-promoting feed screen that includes hot-roll calendaring a woven fiber feed screen to a final height of about 350 μm by flattening or removing tangent points along an outer surface of the feed screen.

The present invention provides improved spiral-wound filter elements that have several advantages. For example, the spiral-wound filter elements of the present invention can achieve permeate fluxes that are close to or about the permeate fluxes provided by cassette filters when operating at the same cross-flow. Additionally, the spiral-wound filter elements of the present invention are able to achieve such permeate fluxes without the penalty of a greatly increased feed channel pressure drop, which occurs in conventional spiral-wound filters. The spiral-wound filter elements of the present invention also offer the performance attributes of cassettes in a compact design that ensures easy incorporation into filtration systems. Additionally, unlike cassettes, the spiral-wound filter elements of the present invention do not require compression housings or liners, and can be placed in disposable sleeves or liners providing increased ease-of use compared to cassettes, particularly for single-use systems. Accordingly, the spiral-wound filter elements of the present invention provide suitable alternatives to cassette filters for use in filtration systems and processes, including TFF systems and processes. FIG. 1 tabulates the comparative properties of commercially available filtration devices, including a P3B030A01 cassette filter (EMD Millipore, Billerica, MA) and a variety of available spiral-wound filter elements, in relation to spiral-wound filter elements of the present invention.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1 is a table listing comparative properties of commercially available filtration devices, including a cassette filter and a variety of available spiral-wound filter elements, in relation to spiral-wound filter elements of the present invention

FIG. 5 is a graph of pressure drop versus cross flow of a reference cassette filter (P3B030A01) and a comparative spiral-wound filter element (Prep/Scale, CDUF006, 12" length filter).

FIG. 14 is a schematic depicting how feed flow permeates through one membrane in outermost feed channel and permeates through two membranes in an inner feed channel.

FIG. 20 is a graph of permeate flux versus cross flow for a conventional cassette filter, a conventional prep/scale spiral-wound filter, and spiral-wound filter elements in accordance with embodiments of the present invention.

FIG. 29 is a graph of permeate flux versus cross flow of a series of two 6" PLCTK membrane spiral-wound filter sub-elements (forming a 12" spiral-wound filter elements) before and after exposure to gamma irradiation in accordance with embodiments of the present invention.

FIG. 32 is a graph of permeate flux versus cross-flow of spiral-wound filter elements including PET feed screen in accordance with embodiments of the present invention.

DETAILED DESCRIPTION

Definitions

Figure 2:
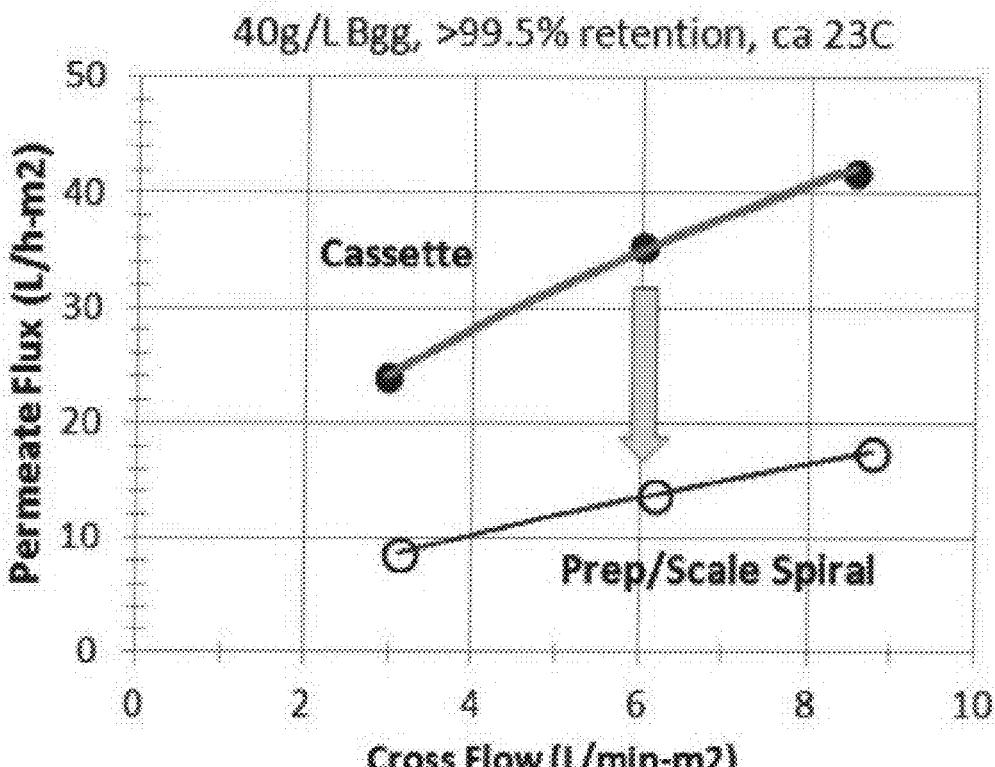
FIG. 2 is a graph of permeate flux versus cross flow of a reference cassette filter and a comparative spiral-wound filter element.

Unless defined otherwise, all technical and scientific terms used herein have the same meaning as commonly understood by one of ordinary skill in the art to which this invention pertains.

As used herein, the singular forms "a", "an," and "the" include plural unless the context clearly dictates otherwise.

The expression "spiral-wound filter element" refers to a filtration membrane that is spirally wound about a core. A spiral-wound filter element may be contained within a housing and may alternately be referred to as a spiral-wound filter module.

"Cassette-like performance" or "cassette filter-like performance" means performance with a permeate flux of at least about 70% of the mass transfer limited permeate flux of a reference cassette filter and a feed channel pressure drop of no more than about 1.2 times the feed channel pressure drop of a reference cassette filter operating at the same cross-flow flux.

"Pressure drop" refers to the drop in pressure (e.g., psid) within a feed channel over the length of the filter element.

"Flux" is the area-normalized flow rate.

"Permeate flux" is the area normalized flow rate of permeate in a permeate channel (e.g., Liters/hr/m2, lmh).

"Cross flow flux" is the area normalized average flow rate of retentate in a feed channel (e.g. Liters/min/m2, lmm).

"Mass transfer limited flux" is the maximum flux attainable regardless of transmembrane pressure. It is proportional to the mass transfer coefficient, which is often described as the ratio of the solute diffusivity to the boundary layer thickness determined by hydrodynamic conditions in feed channel.

"Trans-membrane pressure drop" is the pressure drop normal to the surface of a membrane.

"Cross flow" is the retentate flow rate between inlet and outlet of the feed channel in a filter or a series of filters. Unless otherwise stated, "cross flow" refers to an average cross flow.

The terms "feed," "feed sample" and "feed stream" refer to the solution being introduced into a filtration module for separation.

The term "separation" generally refers to the act of separating the feed sample into two streams, a permeate stream and a retentate stream.

The terms "permeate" and "permeate stream" refer to that portion of the feed that has permeated through the membrane.

The terms "diafiltrate", "diafiltration buffer", and "diafiltrate stream" refer to the solution being used to wash permeate solutes out of the feed stream during a diafiltration process.

The terms "retentate" and "retentate stream" refer to the portion of the solution that has been retained by the membrane, and the retentate is the stream enriched in a retained species.

"Feed channel" refers to a conduit in a filtration assembly, module or element for a feed.

"Permeate channel" refers to a conduit in a filtration assembly, module, or element for a permeate.

The expression "flow path" refers to a channel comprising a filtration membrane (e.g., ultrafiltration membrane, microfiltration membrane) through which the solution being filtered passes (e.g., in a tangential flow mode). The flow path can have any topology which supports tangential flow (e.g., straight, coiled, arranged in zigzag fashion). A flow path can be open, as in an example of channels formed by hollow fiber membranes, or have one or more flow obstructions, as in the case, for example, of rectangular channels formed by flat-sheet membranes spaced apart by woven or non-woven spacers.

"TFF assembly," "TFF system" and "TFF apparatus" are used interchangeably herein to refer to a tangential flow filtration system that is configured for operation in a single-pass mode and/or a recirculation mode (e.g., full or partial recirculation).

"SPTFF assembly," "SPTFF system" and "SPTFF apparatus" are used interchangeably herein to refer to a TFF system that is configured for operation in a single-pass TFF mode.

"Single-pass mode" and "single pass TFF mode" refer to operating conditions for a TFF system/assembly under which all or a portion of the retentate is not recirculated through the system.

"Single leaf" spirals are spiral-wound filter elements that can be formed with one continuous feed channel. They are generally made with one sheet of membrane.

"Multi-leaf" spirals are spiral-wound filter elements that have multiple feed channels. They are generally made with more than 1 sheet of membrane; but can be made with 1 membrane sheet also.

A "cassette holder" refers to a compression assembly for one or more cassettes. Typically, when a cassette holder contains more than one cassette, the cassettes are configured for parallel processing, although, in some embodiments, the cassettes can be configured for serial processing.

A "cassette" refers to a cartridge or flat plate module comprising filtration (e.g., ultrafiltration or microfiltration) membrane sheet(s) suitable for TFF processes.

"Filtration membrane" refers to a selectively permeable membrane capable of use in a filtration system, such as a TFF system.

The terms "ultrafiltration membrane" and "UF membrane" are generally defined as a membrane that has pore sizes in the range of between about 1 nanometer to about 100 nanometers, or alternately defined by the "molecular weight cut off" of the membranes, expressed in units of Daltons, and abbreviated as MWCO. In various embodiments, the present invention utilizes ultrafiltration membranes having MWCO ratings in the range from about 1,000 Daltons to a 1,000,000 Daltons.

The term "microfiltration membranes" and "MF membranes" are used herein to refer to membranes that have pore sizes in the range between about 0.1 micrometers to about 10 micrometers.

The term "high turbulence-promoting screen" as used herein refers to a screen which increases cross flow velocity in a channel (e.g., a feed channel) and promotes mixing near the membrane surface.

The term "expandable feed screen" or "expanding feed screen" means a feed screen that expands with ballooning of the feed channel to maintain contact with a membrane face.

The term "plurality," refers to two or more of a unit, element, or module.

"Fluidly connected" refers to a plurality of spiral-wound membrane TFF modules that are connected to one another by one or more conduits for a liquid, such as, a feed channel, retentate channel and/or permeate channel.

"Product" refers to a target compound that resides in the feed stream. Typically, a product will be a biomolecule (e.g., protein) of interest, such as a monoclonal antibody (mAb) residing in the feed stream.

"Processing" refers to the act of filtering (e.g., by TFF) a feed containing a product of interest and subsequently recovering the product in a concentrated and/or purified form. The concentrated product can be recovered from the filtration system (e.g., a TFF) assembly) in either the retentate stream or permeate stream depending on the product's size and the pore size of the filtration membrane.

The expressions "parallel processing", "processing in parallel", "parallel operation" and "operation in parallel" refer to processing a product in a TFF assembly (e.g., SPTFF assembly) that contains a plurality of processing units that are fluidly connected by distributing the feed directly from a feed channel or manifold to each of the processing units in the assembly.

The expressions "serial processing", "processing in series", "serial operation" and "operation in series" refer to processing a product in a TFF assembly (e.g., SPTFF assembly) that contains a plurality of processing units that are fluidly connected by distributing the feed directly from the feed channel to only the first processing unit in the assembly. In serial processing, each of the other, subsequent processing units in the assembly receives its feed from the retentate line of the preceding processing unit (e.g., the retentate from a first processing unit serves as the feed for a second, adjacent processing unit).

The expressions "conversion," "single-pass conversion," and "conversion per pass" are used herein to denote the fraction of the feed flow flux that permeates through the membrane in a single pass through the flow channels, expressed as a percentage of the feed stream flow flux.

A description of example embodiments follows.
Comparison of Conventional Spiral-Wound Filter Elements to Cassette Filters Conventional spiral-wound filter elements generally have much lower flux than cassette filters, rendering them inferior to cassette filters for several filtration applications. An example is shown in FIG. 2, in which the permeate flux of a benchmark cassette (P3B030A01 C2JA48465-6945-.11 m2) and a conventional spiral-wound filter element (Prep/Scale CDUF006TT-C1KA07028-09-.54 m2) are plotted. For the example shown in FIG. 2, the mass transfer limited flux and pressure drop of the conventional spiral-wound filter element as a function of normalized average cross flow rate was evaluated in a TFF system using 40 g/L bovine gamma globulin (Bgg). The TFF system was run in total recycle mode. Retentate pressure was throttled to 15 psi to ensure that mass transfer limited flux was attained. FIG. 2 shows the permeate flux versus crossflow in a conventional 6" long cassette filter and a conventional 12.5" long spiral-wound filter element. At a typical cross flow of 6 L/min-m2, the conventional spiral-wound filter element flux was about 2.7 times lower than the conventional cassette filter.

Figure 3:
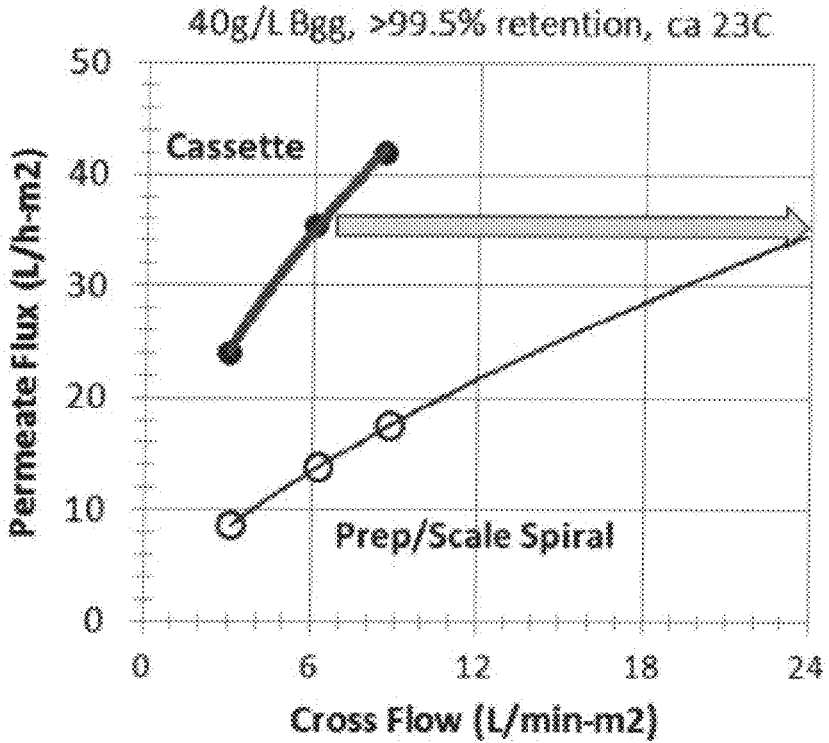
FIG. 3 is an extrapolated graph of the graph of FIG. 2.

FIG. 3 shows an extrapolation of the results shown in FIG. 2. In order to reach the desired 6 L/min·m$^2$ cassette filter flux, the conventional spiral-wound filter module cross flow flux must increase about 4-fold, to 24 L/min·m$^2$.

Cross flow fluxes above 6 L/min·m$^2$ are less desirable for single use TFF systems because they require larger pumps, which are not always available, and larger piping, thereby resulting in a system having a larger footprint, higher capital costs, and larger hold-up volumes. Larger hold-up volumes reduce the maximum concentration factor and can reduce product recovery or lead to dilution of the final product pool.

Figure 4:
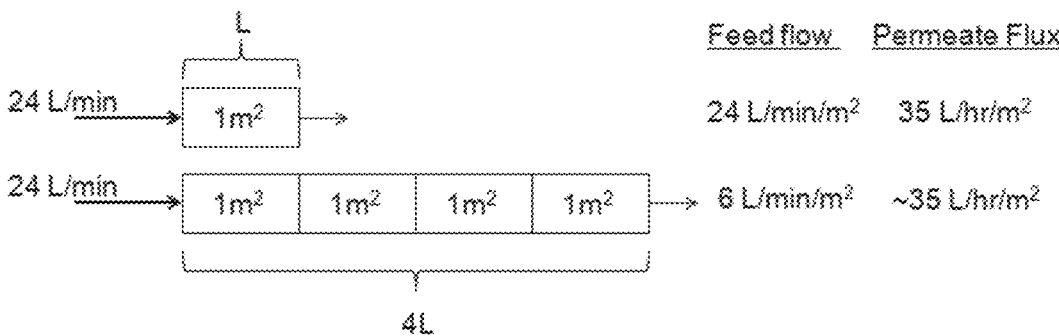
FIG. 4 is a schematic of spiral-wound filter elements in series.

Cross flow flux (e.g., L/min·m$^2$) can be reduced by increasing the length of a feed channel flow path, which can be achieved by placing filter elements in series or by using filter elements having a longer feed channel. Both methods can increase the membrane area for a given pumping rate, while maintaining the approximate feed velocity, and hence permeate flux, for typical low-conversion-per-pass applications (e.g., about 10% of concentrated macromolecules). FIG. 4 illustrates this principle. For example, to decrease cross flow flux 4-fold, the feed channel path length must be increased 4-fold. However, this leads to very long feed channel flow paths, often with more connections, and results in a more complex system, which is undesirable.

Figure 5:
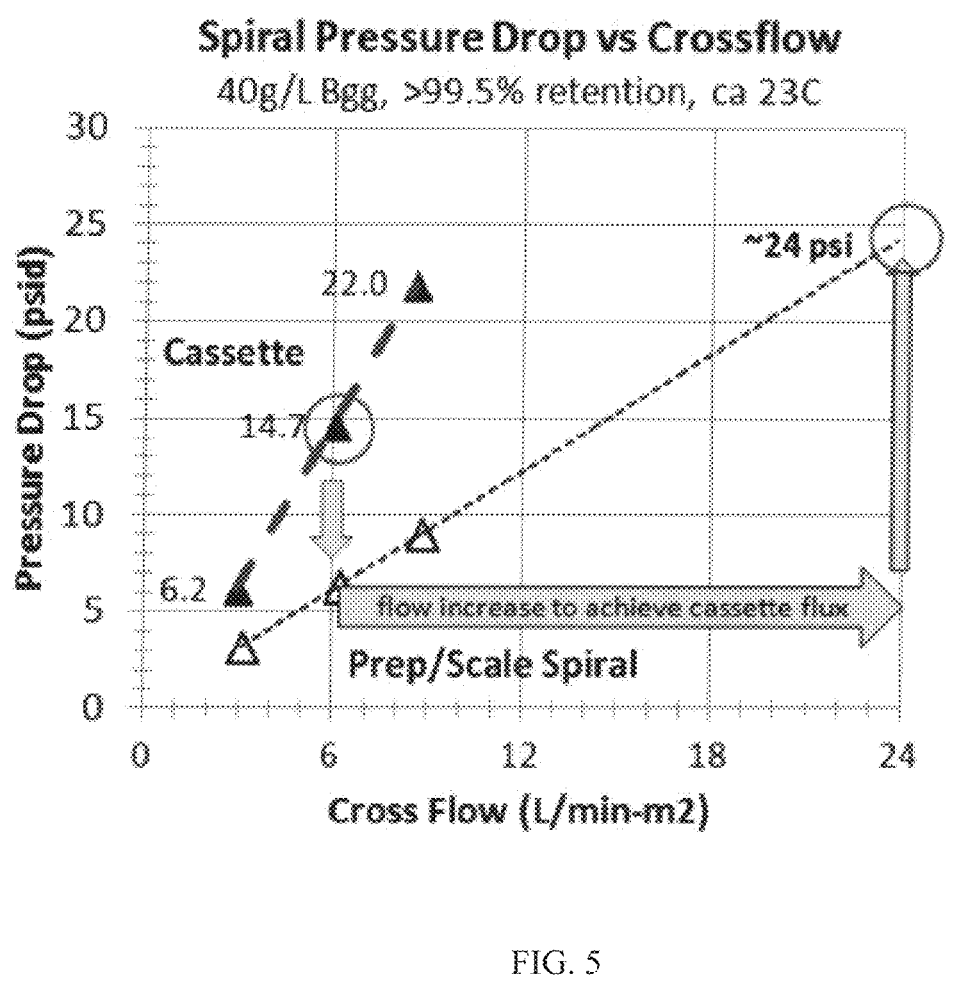

Additionally, lengthening the feed channel flow path proportionally increases the pressure drop across the filter element. FIG. 5 shows the pressure drop as a function of cross flow for the reference cassette (P3B030A01 C2JA48465-6945-.11 m2) and the conventional spiral-wound filter element (Prep/Scale CDUF006TT-C1KA07028-09-.54 m2) shown in FIGS. 6 and 7. As discussed above, in order to meet the permeate flux of the cassette filter at 6 L/min·m$^2$, the spiral-wound filter element requires a 4-fold higher cross flow rate. The pressure drop of spiral-wound filter element at a 4-fold higher cross flow rate is about 24 psid. When the feed path length of the spiral-wound filter element is increased 4-fold (to reduce the cross flow 4-fold, down to the cassette filter target of 6 L/min·m$^2$) the pressure drop increases proportionately. Thus, a 4-fold pressure drop gives a total feed channel path pressure drop of 96 psid in the conventional spiral-wound filter element, which is 6.5 times higher than the cassette filter.

Spiral-Wound Filter Elements Having Cassette-Like Performance

As described here, the present invention provides compact spiral-wound filter elements that provide cassette-like performance. In one embodiment, a spiral-wound filter element has a permeate flux of at least about 70% (e.g., at least 70%, 75%, 80%, 85%, 90%, 95%, 98%, 99%, 100%, 105%, or 110%) of the mass transfer limited permeate flux of a reference cassette filter operating at the same cross flow flux, and a feed channel pressure drop of no more than about 1.2 times (e.g., 1.2, 1.1, 1.0, 0.8, or 0.5 times) the feed channel pressure drop of the reference cassette filter operating at the same cross flow flux. In a particular embodiment, a spiral-wound filter element has a permeate flux of at least about 80% of the mass transfer limited permeate flux of a reference cassette filter operating at the same cross flow flux. In another embodiment, a spiral-wound filter element has a permeate flux of at least about 90% of the mass transfer limited permeate flux of a reference cassette filter operating at the same cross flow flux.

Typical operating conditions for spiral-wound filter elements of the present invention include cross flow fluxes in the range of about 0.1 L/min·m$^2$ and about 12 L/min·m$^2$. Cross-flow fluxes in the range of 4 to 8 L/min·m$^2$ are typical for recirculated batch filtration, while fluxes in the range of 0.1 to 2 L/min·m$^2$ are typical for single-pass filtration. In a particular embodiment, an average operating cross flow flux is about 6 L/min·m$^2$. Typical operating temperature can be in the range of about 15° C. to about 30° C., or more typically about 20° C. to about 25° C. Typical retentate pressure can be in the range of about 10-20 psig.

Cross flow flux can be determined by measuring an average feed flow rate in the TFF device (e.g., a spiral-wound filter element, or cassette filter) and dividing the average by the membrane area in the TFF device. Average feed flow rate is the sum of feed and retentate flow divided by two. Average feed flow rate is often measured as the sum of the retentate flow rate and half the permeate flow rate. Cross flow flux is typically represented in units of liters per minute per square meter (L/min-m$^2$). Flow rates can be measured with flow meters. Flow rates can be measured by collecting a known volume (or weight, for a known density) in a vessel over a known period of time.

Permeate flux can be determined by measuring the permeate flow rate in the TFF device and dividing the flow rate by the membrane area in the TFF device. Permeate flow rate can be measured by collecting a known volume (or weight, for a known density) in a vessel (e.g. a graduated cylinder) over a known period of time. Permeate flux is typically represented in units of liters per hour per square meter (e.g., L/hr/m²).

Feed channel pressure drop can be determined by subtracting a measured retentate pressure from a measured feed pressure, across the TFF device. Feed and retentate pressures can be measured with pressure gauges or pressure transducers.

The mass transfer limited flux of a TFF device at a given cross flow rate for a given feed solution is determined by increasing the observed trans-membrane pressure until the permeate flux no longer increases.

A trans-membrane pressure drop can be determined by taking the average of the feed and retentate pressure minus the permeate pressure.

In some embodiments, a spiral-wound filter element has an average cross flow flux of between about 2 and about 12 L/min·m², such as about 0.1 and about 2 L/min·m². In further embodiments the spiral-wound filter element can have a feed channel pressure drop of about 5 to about 30 psid, such as about 5 to 20 psid.

Reference cassette filters can serve as a benchmark against which performance of a compact spiral-wound filter element of the present invention can be measured. Such cassettes may alternatively be referred to as benchmark cassette filters. Examples of suitable reference cassettes include, but are not limited to, various TFF cassettes supplied by EMD Millipore Corporation (Billerica, MA), such as, for example, Pellicon® cassettes with Biomax® membrane or Ultracel® membrane. Particular examples of reference cassettes include Pellicon® 3 mini-cassette, 0.11 m² made with a Biomax®-30 membrane, nominal 6" port-to-port feed path, an "a-screen" feed screen, and a "b-screen" permeate screen (P3B030A01); and, Pellicon® 3 mini-cassette, 0.11 m² made with an Ultracel®-30 membrane nominal 6" port-to-port feed path, a "c-screen" feed screen, and a "b-screen" a permeate screen (P3C030C01).

Performance of spiral-wound filter elements of the present invention can be evaluated against the performance of a reference cassette. For example, performance of the spiral-wound filter element at a cross flow of about 6 L/min·m² on 40 g/L Bgg at 23° C. can be at least 30 L/hr·m² permeate flux and no more than 14.5 psid feed channel pressure drop, with greater than 99% Bgg retention, for providing cassette-like performance.

Spiral-wound filter elements typically comprise, for example, a permeate drainage tube (core), filtration membrane, feed spacer screen, permeate spacer screen, and adhesive (e.g., glue, epoxy). The permeate core can be, for example, a polysulfone tube with a number of small holes located along the expected width of the permeate envelope open end to allow discharge of permeate from the filter element.

Figure 6:
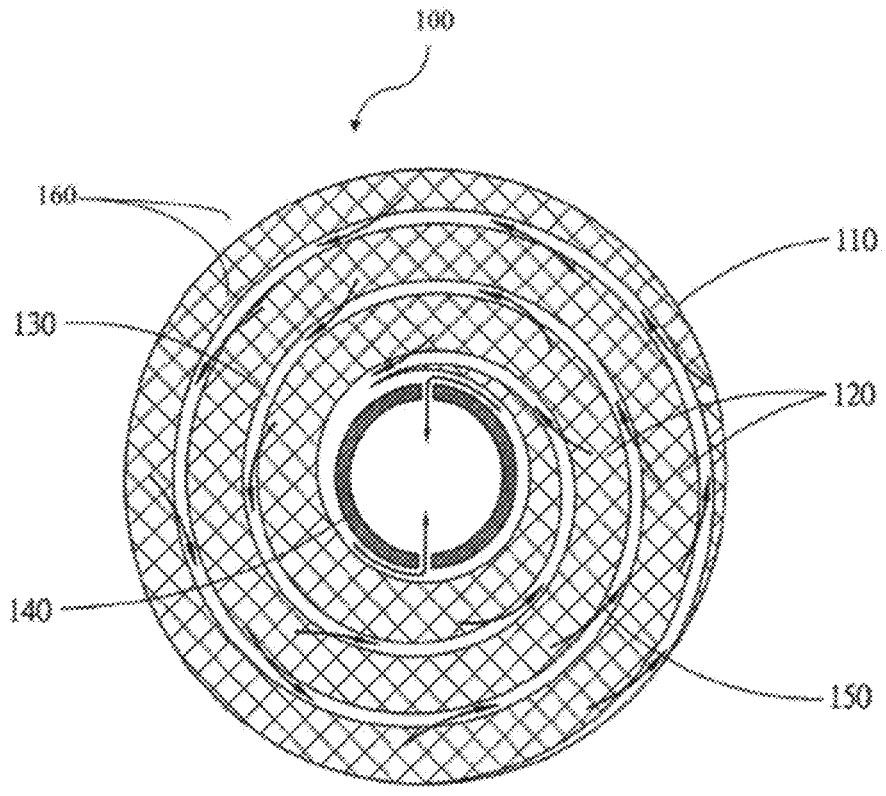
FIG. 6 is cross-sectional view of a spiral-wound filter element.

FIG. 6 shows a cross-sectional view of an example of a spiral-wound filter element 100 in accordance with embodiments of the present invention. The spiral-wound filter element 100 includes membrane layers 160, feed channel components 120 (e.g. feed spacer), and permeate channel components 130 (e.g. permeate spacer) wound about a perforated hollow core permeate collection tube 140. Arrows 150 indicate the flow direction of permeate. The filter membrane layers 160 are in planar contact with outer surfaces of the feed spacer 120. The feed spacer 120 serves as both a mechanical stabilizer for channel geometry and a turbulence promoter for reducing polarization phenomena near the membrane surface. The permeate spacer 130 provides support for the filter membrane layers 160 and maintains a flow channel for the discharge of permeate.

Filtration membranes that can be used in the spiral-wound filter elements described herein are known in the art and include, for example, ultrafiltration membranes, microfiltration membranes, reverse-osmosis membranes, or nanofiltration membranes. Such membranes generally have a non-woven backing material or microporous membrane support. Filtration membranes can be formed, for example, from regenerated cellulose, polyarylsulphones, polyvinylidene fluoride (PVDF), polypropylene, polyester, polyethersulfone (PES), polyethylene, polyethersulfone, polysulfone, poly-acrylonitrile, nylon, ethylene chlorotrifluoroethylene, polyimide, polyamide, fluoroethylenepropylene, perfluoroalkoxy, polytetrafluorethylene, polyetheretherketone, polysynidilenesulfide, and polycarbonate. Particular examples of suitable filtration membranes include Biomax®-30 membranes and Ultracel®-30 membranes. Biomax®-30 membranes are modified polyethersulfone membranes on non-woven polyolefin backings with nominal molecular weight cutoff of 30 kilodaltons. Ultracel®-30 membranes are regenerated cellulose membranes on high density polyethylene 0.6 μm microporous substrates with nominal molecular weight cutoff of 30 kilodaltons.

Feed spacers or screens are known in the art and can include a variety of suitable materials (for example, polyethylene, polypropylene, and polyester) and can have a variety of geometries (for example, extruded biplanar and woven monofilament mesh polypropylene, in square weave or twill). Permeate spacers or screens are known in the art and are typically similar to feed screens in materials and geometries, with the exception of Tricot double-knit polyester impregnated with epoxy. Particular examples of screens that can be used as feed spacers and/or permeate spacers include, for example, a-screens, b-screens, and c-screens (Propyltex® screens, Sefar, QC, Canada). An a-screen is a woven 200 μm (approximate) mono-filament polypropylene diameter fiber screen employing a square twill 2-over-1 right hand weave at 51 strands per inch, having a total nominal weave thickness of 420 μm and open area of about at 36%. A b-screen is a woven 150 μm (approximate) mono-filament polypropylene fiber screen employing a square twill 2-over-1 right hand weave at 70 strands per inch and having total nominal weave thickness of 320 μm and open area of ca at 34%. A c-screen is a woven 250 μm (approximate) mono-filament polypropylene diameter fiber screen employing a square twill 2-over-1 right hand weave at 42 strands per inch and having total nominal weave thickness of 525 μm and open area of ca at 34%.

Adhesives are known in the art and include. but are not limited to, glues, polyurethanes, or epoxies.

In some embodiments, spiral-wound filter elements of the present invention have short path lengths that are approximately the same as those of cassette filters, which can be about 6"-18" in length (e.g., 6", 8", 10", 12", 12.5", 14", 16", and 18"). In a particular embodiment, a spiral-wound filter element has a feed channel length of about 12.5" (e.g., 12", 12.5", and 12.55") or less. In another embodiment, a spiral-wound filter element has a feed channel length of about 6" (e.g., 5.95", 6", 6.25").

In some embodiments, a spiral-wound filter element can include sub-elements of shorter lengths in order to form a desired spiral-wound filter element length. For example, a spiral-wound filter element having a length of 12" can be formed from two 6" spiral-wound filter sub-elements.

As described herein, increasing feed channel efficiency can increase the performance of spiral-wound membrane elements such that the spiral-wound filter element can provide cassette-like performance. Embodiments of the present invention include spiral-wound filter elements having high turbulence-promoting feed screens. High turbulence-promoting screens can be net-like woven mesh screens which increase cross flow velocity in the feed channel of the spiral-wound filter element and promote mixing near the membrane. For example, a-screens and c-screens, described above, can be high turbulence-promoting feed screens. High turbulence-promoting feed screens are available commercially from Sefar, Inc. (Chicoutimi, Canada).

To increase efficiency while maintaining a short path length in a spiral-wound filter module, filter elements can be constructed using thin feed screens and thin permeate screens. For example, a suitable feed screen can have an uncompressed height (thickness) of about 600 μm or less (e.g., 600 μm, 550 μm, 500 μm, 450 μm, 400 μm, 300 μm, etc.). In a particular embodiment, the feed screen has an uncompressed height of about 350 μm or less (e.g., 350 μm, 320 μm, 300 μm). A permeate screen can have an uncompressed height (thickness) of about 200 μm to about 800 μm. In particular embodiments, the permeate screen has an uncompressed height of about 600 μm or less (e.g., 600 μm, 560 μm, 610 μm). In certain embodiments, the permeate screen has an uncompressed height of about 300 μm or less (e.g., 300 μm, 260 μm, 130 μm). In some embodiments, the feed channel length is less than about 800 times the feed channel height.

The height of a permeate channel or feed channel will typically be defined by a height of the screen (or "spacer"), if present, contained in the channel (e.g., in the absence of ballooning). In some instances, a screen (e.g., feed screen) can imprint into a membrane, for example, up to 65 μm on each side into an adjacent membrane. A compressed or imprinted screen (e.g., feed screen) can be desirable because it is able to spring open or expand during operation to maintain contact with surfaces of the adjacent membrane and limit ballooning. This can prevent the cross flow, or a portion of the cross flow, from bypassing the feed screen.

Alternatively or in addition, thick and/or stiff feed permeate screens, which provide minimal compression during operation, can also be used to ensure that high pressure feed does not cause permeate channels to collapse. Permeate channels support discharge of permeate from the device and can further provide support to prevent a feed channel from ballooning. For example, with a compressed feed screen or a feed screen imprinted up to 65 μm on each side into an adjacent membrane, the supporting permeate screen should compress less than 130 μm (for example, approximately 50 psi at 23° C.) to limit ballooning of the feed channel when the feed channel is energized with feed pressure and/or keep the feed screen within the imprint during ballooning.

Stiff feed screens generally compress less than about 130 μm in height under compression of about 50 pounds per square inch at operating temperature (e.g., 23° C.). Thicker permeate screens generally require greater stiffness, e.g., in order to keep compression below a desired level. Tensile modulus provides a measure of stiffness and is determined by compressive pressure (force per area) times the screen thickness and divided by the compression fraction (compression distance over original thickness). For example, for a desired tensile modulus of 100 psi is desirable for a compressive pressure of 50 psi on a 260 μm thick (thin) screen that compresses to 130 μm. Thicker screens, such as a 520 μm thick screen, require a higher tensile modulus of, for example, 200 psi, in order to keep compression below a desired level.

In another embodiment, the present invention relates to a method of producing a high turbulence-promoting feed screen that can be incorporated into a spiral-wound filter element. In some embodiments, the method is useful for producing a feed screen having a geometry that mimics the feed channel geometry of cassette filters. The method comprises the steps of hot-roll calendaring a woven fiber feed screen to a final height of about 350 μm or less and flattening or removing tangent points along an outer surface of the feed screen. An example of producing a high-turbulence feed screen is provided in Example 3 herein.

Figure 7:
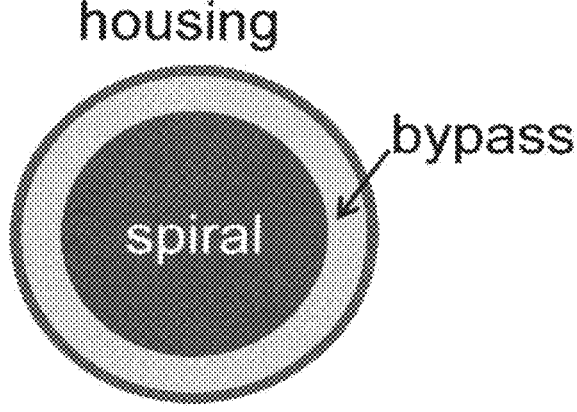
FIG. 7 is a cross-section view of bypass flow (annular) space around a conventional spiral-wound membrane element.
Figure 8:
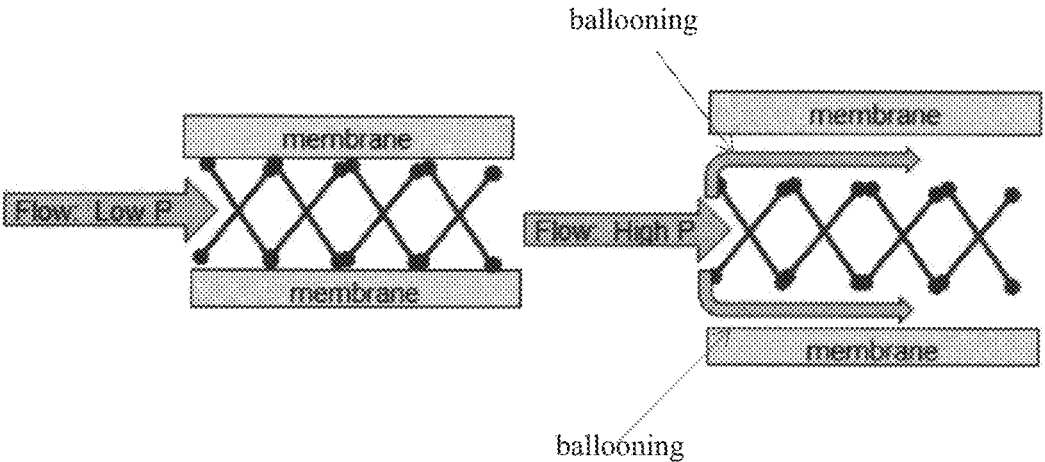
FIG. 8 is a schematic depicting a mechanism of ballooning.
Figure 9:
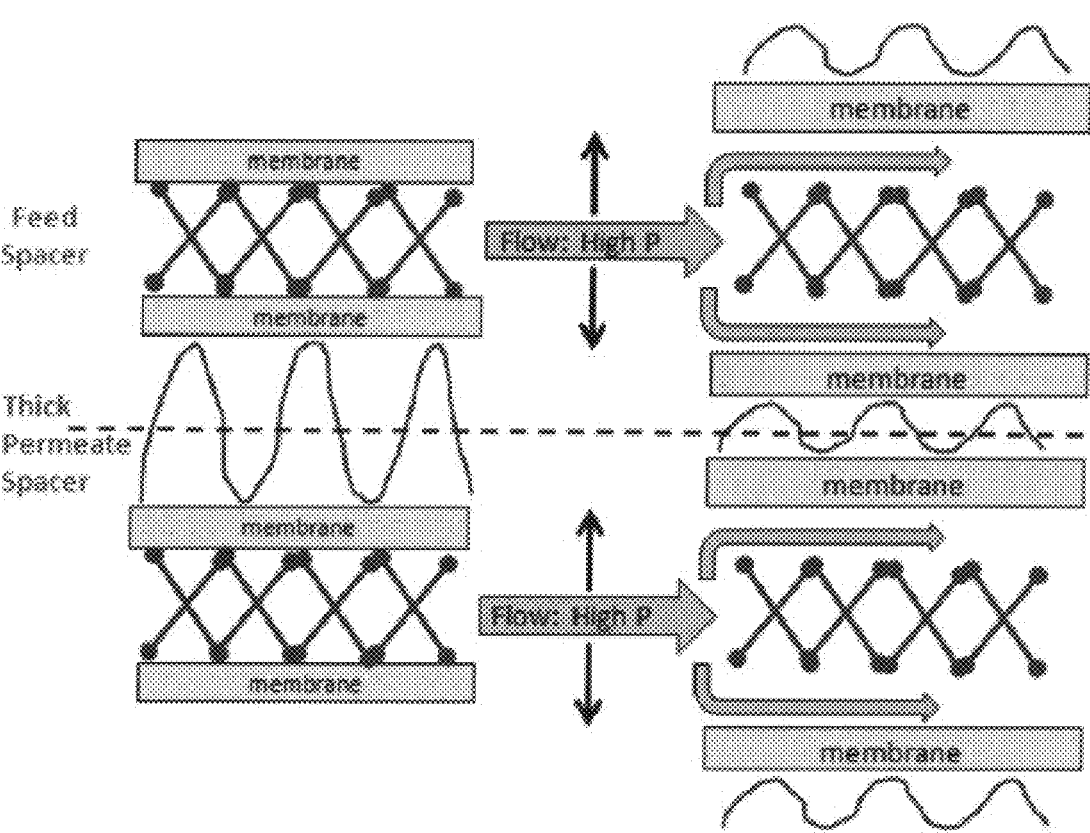
FIG. 9 is a schematic depicting ballooning with a thick permeate screen (spacer).
Figure 10:
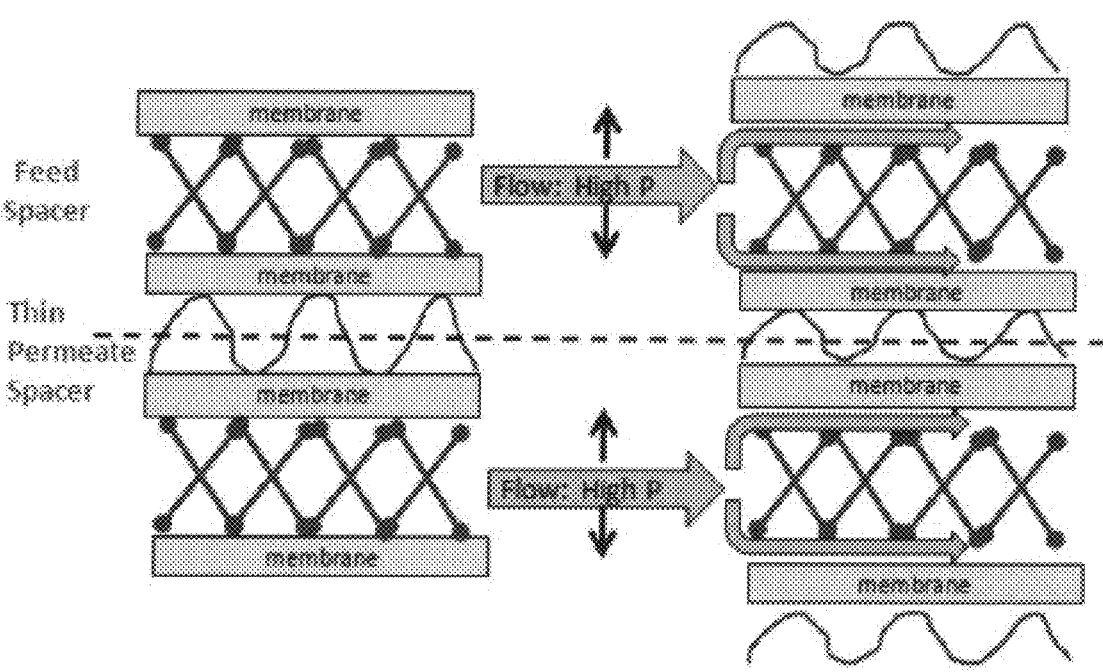
FIG. 10 is a schematic depicting ballooning with a thin permeate screen.
Figure 11:
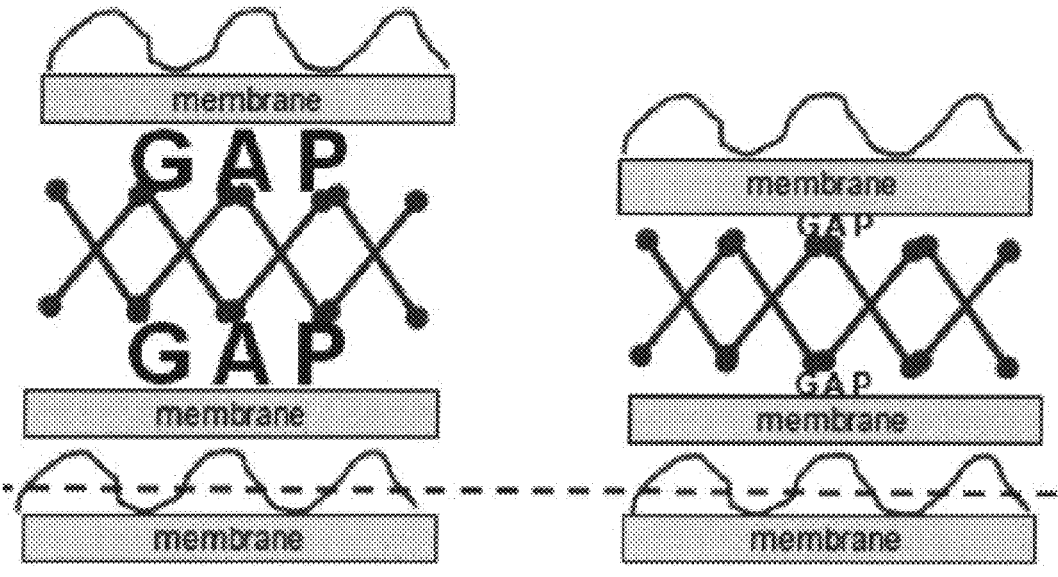
FIG. 11 is a schematic depicting a comparison of bypass upon ballooning with thick (left) and thin (right) permeate screens.
Figure 12:
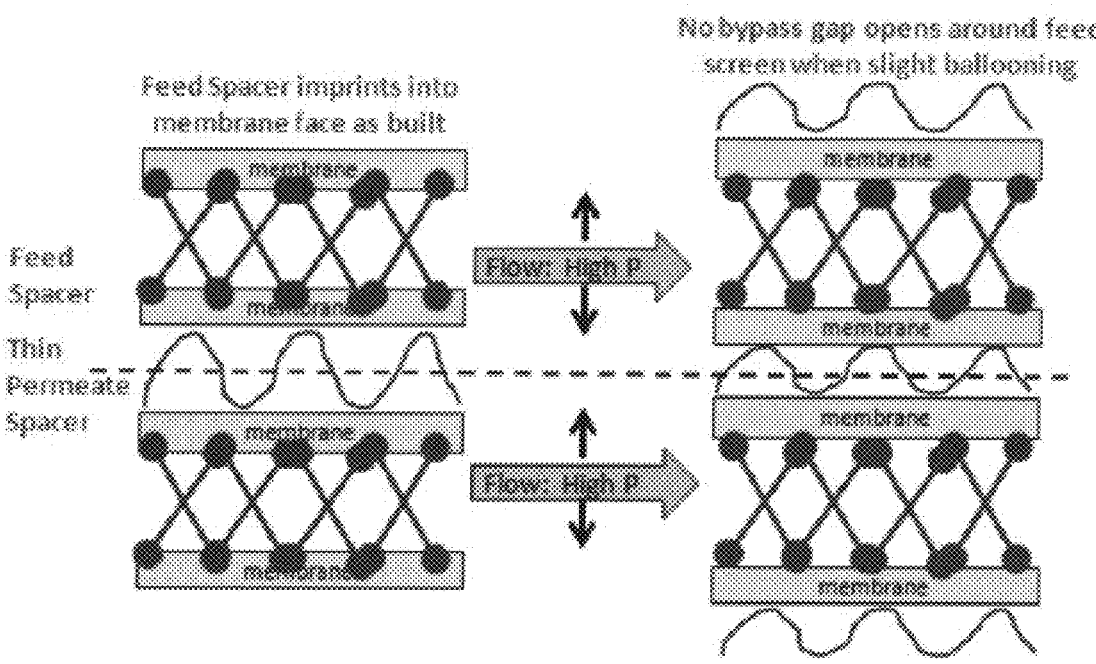
FIG. 12 is a schematic depicting imprinting of a feed screen into a membrane and mitigation of ballooning.
Figure 13:
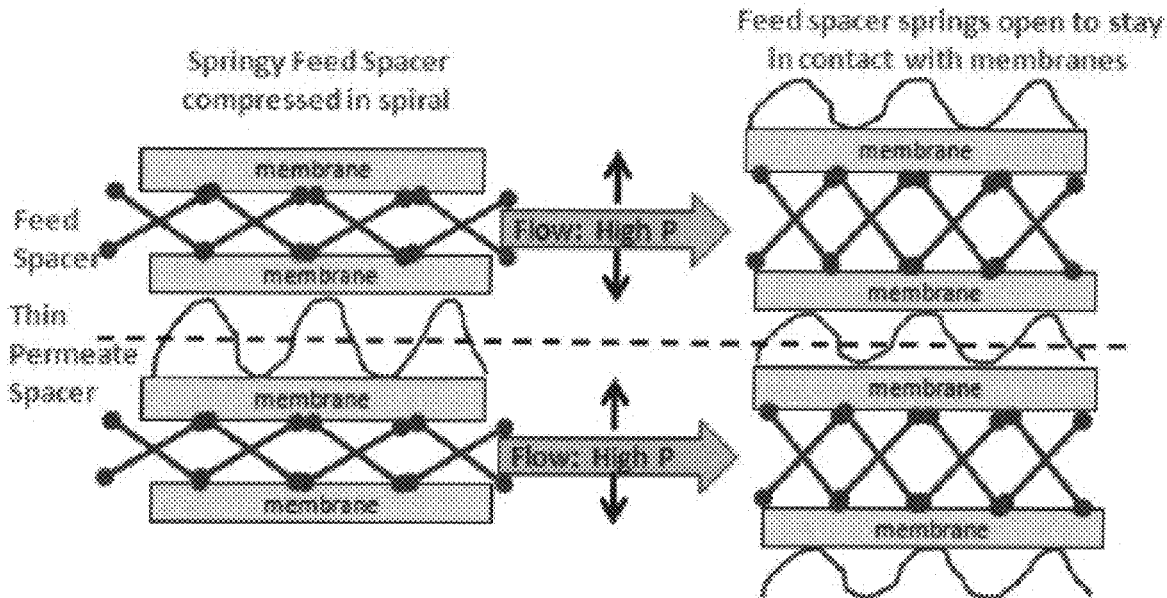
FIG. 13 is a schematic depicting an expanding feed screen and mitigation of ballooning.

Spiral-wound filter elements described herein have the advantage of reducing or eliminating ballooning during filtration. As shown in FIG. 7, spiral-wound filter elements can contain a bypass area between the spiral filter element and the housing. Ballooning, illustrated in FIG. 8, occurs when high pressure in the feed channel pushes the membranes outward under the positive transmembrane pressure (TMP) from the feed channel to the permeate channel (used to drive the flow of permeate through the membrane) and can allow bypass flow around the feed screen. The use of a thicker and/or easily compressible permeate screen, as shown in FIG. 9, can result in increased ballooning during operation. As shown in FIG. 10, the use of a thinner and/or stiffer permeate screen can result in decreased ballooning. Additionally, the use of a thin permeate screen case can reduce the creation of a gap between feed spacer material and the membrane, as shown to the right in FIG. 11 and as compared to a thick permeate screen case shown to the left in FIG. 11. FIGS. 12 and 13 illustrate additional approaches that reduce feed screen bypass from ballooning, including a feed spacer that is imprinted into the membrane and compression of feed spacer material during production.

Accordingly, in some embodiments, the present invention provides spiral-wound filter elements having feed screens that are precompressed, expandable, and/or imprinted into the membrane.

In addition to decreasing ballooning, feed channel efficiency can be improved by blocking an outermost feed channel of a spiral-wound filter element. FIG. 14 illustrates the feed flow and permeate flow directions from layers of membrane located within a housing. The outer feed flow channels generally are underutilized since they only drive flux through one membrane wall. Thus, in some embodiments, an outermost feed channel layer in the spiral-wound filter element is blocked (e.g. with glue, epoxy, etc.), such that feed is routed to the more efficient feed channel(s) located closer to a core of the spiral-wound element.

By reducing ballooning effects and routing feed to more efficient feed channels in spiral-wound filter elements, increased efficiencies can be gained. With increased feed channel efficiency, spiral-wound filter elements having a short path length can be used in TFF systems, e.g., SPTFF systems. Thus, in some embodiments of the present invention, efficiency and compactness are built into the design of the spiral element. An estimate of efficiency can be provided by measuring the pressure drop needed to attain a target flux at a desired average cross flow flux.

Figure 15:
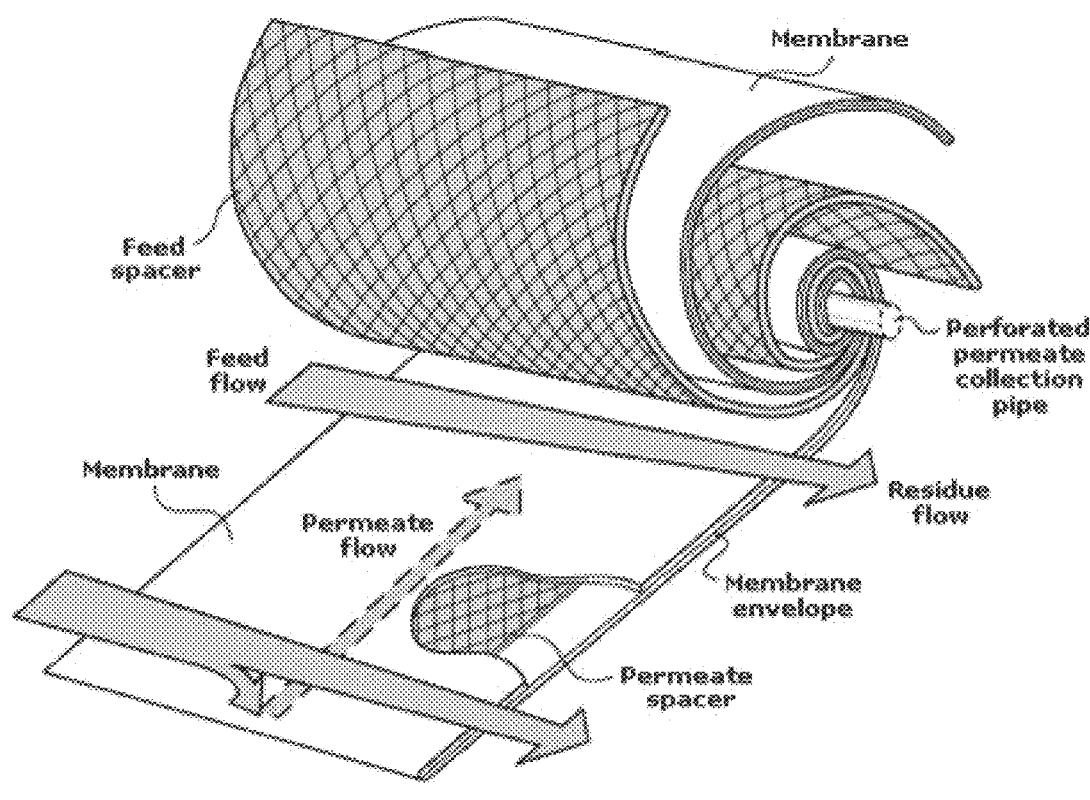
FIG. 15 is a perspective view of a spiral-wound filter element.
Figure 16:
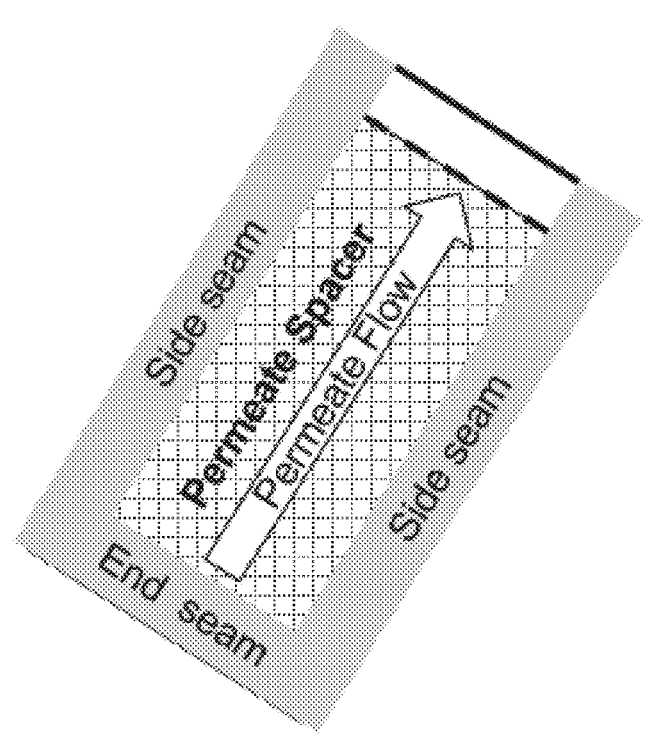
FIG. 16 is a schematic of a membrane envelope of a spiral-wound filter element.

Methods of assembling spiral-wound filter elements are known in the art. For example, a spiral-wound filter element can be assembled by lay-up of a membrane (creating at least one membrane leaf from the folding of a membrane around a feed screen), attachment of the membrane leaf (or leaves) to a permeate core, and winding of the membrane leaf about the core. FIG. 15 shows the assembly of a multi-leaf spiral-wound filter element with arrows indicating feed flow direction and arrows indicating permeate flow within a membrane envelope 215. Additional layers of permeate spacer may be wound about the core (i.e., core wraps) before the membrane is introduced during winding (not shown in FIG. 15). Spiral-wound filter elements can be single-leaf (containing a single membrane envelope) or multi-leaf (containing two or more membrane envelopes). As shown in FIG. 16, side and end seams are made to seal the membrane envelope so that feed cannot bypass the membrane to the permeate channel. Permeate is directed to flow to the core of the filter element.

In embodiments of the present invention, it may be desirable to reduce or eliminate membrane tails and/or screen tails during assembly of spiral-wound filter elements. Methods of reducing or eliminating membrane and screen tails are known in the art and include, for example, providing an offset, trimming, or folding to reduce the amount of excess membrane or screen that remains after the winding of the spiral-wound filter element is completed. Reducing or eliminating membrane and screen tails is referred to herein as "streamlining."

Embodiments of the present invention include spiral-wound filter elements in a housing (e.g., reuseable housing, disposable housing), sleeve, or liner. Spiral-wound filter elements are placed in housings in such a way as to enable connection to a filtration system (e.g. a TFF system), contain pressure, and keep feed, retentate, and permeate streams separated. Housings can be stainless steel, plastic, or other suitable material based on considerations such as strength, chemical compatibility, and safety of extractable materials for the intended application. Several individual modules can be connected together in a manifold network. These manifolds provide parallel, series, or mixed flow of feed, retentate, and permeate through the module network.

Spiral-wound filter elements of the invention that are disposable or single use are particularly suitable for applications in the biotechnology industry because single use avoids the need for cleaning, cleaning validation, and validation of the performance of the re-used filter. Furthermore, single-use spiral-wound filter elements and modules completely eliminate the possibility of cross-contamination, which is an important aspect of pharmaceutical processing.

Tangential Flow Filtration Systems Comprising Spiral Wound Filter Elements of the Invention The spiral-wound filter elements of the present invention are suitable for use in a variety of filtration systems and methods. In a particular embodiment a spiral-wound filter element is used in a TFF system. TFF systems are known in the art. In a particular embodiment, the TFF system can be operated in a single pass mode (SPTFF). In another embodiment, the TFF system is operated in a recirculation mode. The TFF systems can have one or more than one spiral-wound filter element described herein. In systems having more than one spiral-wound filter elements, the spiral-wound filter elements can be fluidly connected in series or in parallel, or both.

TFF systems generally provide a flow path and controls to deliver the concentration and diafiltration processes sometimes required to convert feed to a desired intermediate or final product and to recover the product at an acceptable concentration and purity. A TFF device containing a spiral-wound filter module of the present invention, will generally include the necessary connections, separation capability, and membrane area to accomplish the tangential flow filtration in the required time.

Figure 17:
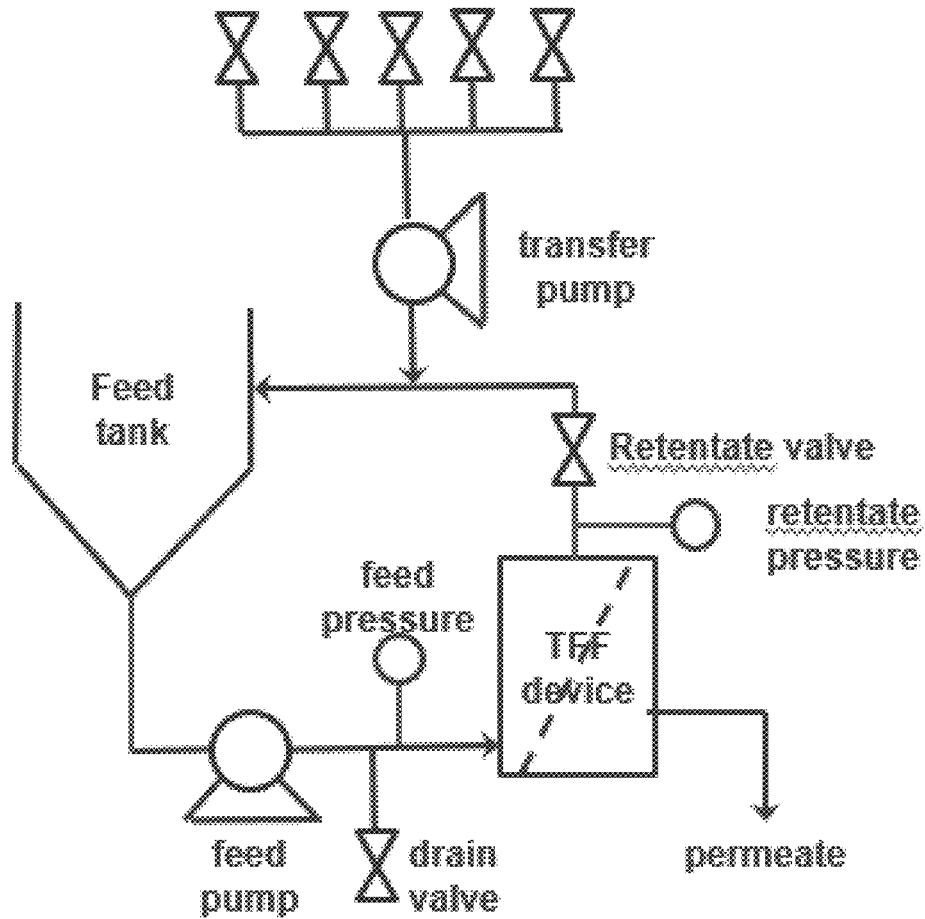
FIG. 17 is a diagram of a Tangential Flow Filtration (TFF) system.

An example TFF system is shown in FIG. 17. Pressurized feed from the recirculation tank is connected to the feed port of the spiral-wound filter module or manifold (TFF device). Feed flows through the membrane lined feed channel of the TFF device(s) under an applied trans-channel pressure drop, typically achieved by pressurizing the feed using a pump. Some of the solvent from the feed stream flows through the face of the membrane into the permeate channel and carries with it a portion of the permeable species. The remaining concentrated feed stream flows out of the module or manifold through the retentate port. The permeate flowing from the module's permeate port is directed to a location that is dependent on the process, where it is either retained or discarded.

The TFF systems containing spiral-wound filter elements that are employed in recirculating TFF methods can include at least one pump or control valve for recirculating retentate through all or part of the system and at least one conduit for recirculating (e.g., carrying) retentate. The amount of retentate that is recirculated can be controlled using, for example, a pump or a valve. A flow meter can be used to provide a process value for the pump or valve to control the amount of retentate that is recirculated. Thus, in some embodiments, the TFF systems described herein for use in the partial recirculation TFF methods of the invention can further comprise a valve or pump and/or a flow meter for controlling recirculation of retentate. Preferably, the valve or pump and/or flow meter is positioned on the retentate outlet or flow line carrying retentate out of the system to the retentate receptacle.

Maximum achievable flux during TFF system operation is obtained by selection of an adequate transmembrane pressure (TMP) for permeate discharge. This applies to pressure-dependent and mass-transfer-limited regions of operation. For spiral-wound filters, attainment of the desired TMP is determined by measurement at the end of the module. For cassettes with two permeate outlets, attainment of the desired TMP is determined by the average feed channel pressure. The transmembrane pressure must be sufficient to support both the pressure drop through the membrane and the maximum pressure to discharge permeate from the permeate channel.

TFF Processes of the Invention

In one embodiment, the invention relates to a method of passing a liquid feed through a spiral-wound filter element of the invention, separating the liquid feed into permeate and retentate in the filter element; and recovering the permeate and at least a portion of the retentate from the filter element.

The TFF systems described herein typically are also useful for single-pass TFF (SPTFF) methods and partial recirculation TFF methods. In a particular embodiment, the TFF process comprises recovering permeate and a portion of the retentate from the system in separate containers without recirculation through the TFF system, and recirculating the remainder of the retentate through the TFF system at least once.

Recirculating all or a portion of the retentate during start up provides a method by which to ensure that system has reached equilibrium and the retentate has achieved the desired concentration prior to collecting it into the product vessel. It also provides a convenient way to respond to system upsets during processing to provide a more robust process. The fraction of retentate that is recirculated can be adjusted via modulation of the pump or control valve as a way to tune the system in order to assure consistent retentate concentration and/or consistent retentate flow rate to the product collection vessel every run even if feedstock protein concentration, new membrane permeability, membrane fouling, membrane permeability, or membrane mass transfer or pressure drop varies from batch to batch. This strategy has particular benefits in the context of continuous processing where the success of subsequent operations rely on the output of a previous operation. Recirculation of retentate can improve cleaning effectiveness through increased cross flow velocity and reduce cleaning solution through recirculation.

Typically, at least about 50% of the retentate is collected after a single pass, while the remainder of the retentate is recirculated. Preferably, about 10% or less (e.g., about 0.5%, about 1%, about 2%, about 5%, about 10%) of the retentate is recirculated after the first pass through the TFF system.

The retentate that is being recirculated can be returned to any upstream location in or before the TFF system. In one embodiment, the retentate is recirculated to the feed tank. In another embodiment, the retentate is recirculated to the feed line near the feed pump before the feed inlet on the TFF system.

In some embodiments, the methods described herein further comprise performing diafiltration (e.g., to remove or lower the concentration of salts or solvents in the liquid feed, or to accomplish buffer exchange). In a preferred embodiment, the diafiltration is performed by concentrating the liquid feed (e.g., by TFF) to reduce the diafiltration volume and then restoring the feed to its starting volume by adding diafiltration solution (e.g., diafiltration buffer), a process which is known in the art as discontinuous, or batch, diafiltration. In another embodiment, the diafiltration is performed by adding the diafiltrate solution to retentate to increase the diafiltration volume followed by concentrating the sample to restore it to its original volume. In yet another embodiment, the diafiltration is performed by adding the diafiltration solution to unfiltered feed at the same rate that permeate is removed from the TFF system, a process which is known in the art as continuous, or constant-volume, diafiltration. Suitable diafiltration solutions are well known and include, for example, water and various aqueous buffer solutions. To perform diafiltration, the TFF system can include a reservoir or container for diafiltration solution and one or more conduits for carrying diafiltration solution from the diafiltration solution container to the liquid feed tank.

To avoid extremes of concentration and in-line dilution as part of the diafiltration process (e.g. >90%), it is preferred to inject the diafiltrate into multiple sections of the filtration assembly to restore the flow in the retentate section to the same flow as in the initial feed. This requires matching the rate of diafiltrate buffer addition with the rate of permeate removal. A preferred method is to use a single pump with multiple pump heads containing the diafiltrate addition and permeate removal flow lines (e.g. Peristaltic pump from Ismatec (Glattbrugg Switzerland)). Each pump head will have closely-matched pumping rates so this process will be balanced and maintain efficient buffer exchange. It is recommended to match flows for each of the multiple sections by using pumps containing up to 24 channels. The diafiltrate can be injected into the retentate ports in manifolds or separator plates.

The present invention provides improved spiral-wound filter elements that have several advantages. The spiral-wound filter elements of the present invention can achieve permeate fluxes that are close to or about the permeate fluxes provided by cassette filters when operating at the same cross-flow. Additionally, the spiral-wound filter elements of the present invention are able to achieve such permeate fluxes without the penalty of a greatly increased feed channel pressure drop, which occurs in conventional spiral-wound filters. The spiral-wound filter elements of the present invention also offer the performance attributes of cassettes in a compact design that ensures easy incorporation into filtration systems. Additionally, unlike cassettes, the spiral-wound filter elements of the present invention do not require compression housings or liners, and can be placed in disposable sleeves or liners providing increased ease of use compared to cassettes, particularly for single-pass systems. Accordingly, the spiral-wound filter elements of the present invention provide suitable alternatives to cassette filters for use in filtration systems and processes, including TFF systems and processes.

EXEMPLIFICATION

For the purposes of testing embodiments of the present invention, references are made to the following benchmark cassette filters: Pellicon® 3 mini-cassette, 0.11 m$^2$ made with a Biomax®-30 membrane, nominal 6" port-to-port feed path, an "a-screen" feed screen, and a "b-screen" permeate screen (P3B030A01), and, a Pellicon® 3 mini-cassette, 0.11 m$^2$ made with an Ultracel®-30 membrane nominal 6" port-to-port feed path, a "c-screen" feed screen, and a "b-screen" a permeate screen (P3C030C01).

In spiral-wound filter elements, prep/scale (P/S) screens were also utilized. For the purposes of testing embodiments of the present invention, references are made to the following P/S screens: a P/S feed screen of high density polyethylene and employing a square plain 1-over-1 weave at 33×33 strands per inch, having a nominal screen thickness of 508 μm and open area of ca at 42%; and, a P/S permeate screen of biplanar polypropylene at 32.5×32.5 strands per inch, having a nominal screen thickness of 508 μm and open area of about 39% as measured by scanning electron microscope (SEM).

A typical TFF test stand was used for examples described below. The TFF stand set was for a total recycle and included the following features: a nominal 4 L sloped-to-drain-bottom tank with overhead impeller mixer; about 0.4 to 4 lpm Quattroflow diaphragm pump; mass flow meters for retentate and permeate streams; pressure gauges for feed, retentate and permeate lines; diaphragm style retentate valve; and, temperature controls through a concentric tube heat exchanger in the feed line and a double-walled feed tank in a chiller-driven loop with a thermocouple thermometer in tank. Piping was 316L stainless steel with fraction tri-cover sanitary connectors and hose barb to flexible tubing where needed. TFF filter holders (EMD Millipore, Billerica, MA) include stainless steel Pellicon® Mini holder torqued to ca 190 in-lbs for Pellicon® Mini cassettes and Prep/Scale holder for comparative spiral-wound filter module, Prep/Scale, and prototype spiral-wound filter elements disposed in Prep/Scale housings.

Example 1: Examples of Compact Spiral-Wound Filter Elements Having Cassette-like Performance Five sample spiral-wound filter elements were prepared for cross-flow, energy, and pressure drop comparison. All samples were assembled with Biomax®-30 membranes and thin feed channels containing a-screens (high turbulence-promoting screens). Further, all samples had the annular space between the spiral and the housing sleeve potted with 2-part curing glue to prevent bypass flow around the spiral filter element and to block feed flow from entering the outer feed channel. Compact Spirals 1 and 2 were prepared with a prep/scale (P/S) permeate screens. Spiral 2 was additionally subjected to compression during the glue envelope curing process by a series of hose clamps placed around the circumference and along the length of the filter element (excluding the end-seam regions). Spirals 3, 4, and 5 were prepared with a Tricot ("T") permeate screen, which is thinner than the P/S permeate screen of Spirals 1 and 2. Samples 3 and 4 were prepared without compression. During the preparation of Samples 4 and 5, the feed screen and the membrane tail pieces extending beyond the permeate envelope end seam were eliminated to eliminate flow in the feed screen tail. All samples were tested using a 0.22 μm filtered 40 g/L±2 g/L bovine gamma globulin (Bgg) solution of phosphate buffered saline. Operating conditions were at 23° C.±1° C. and at a retentate pressure of 15 psig.

Figure 18:
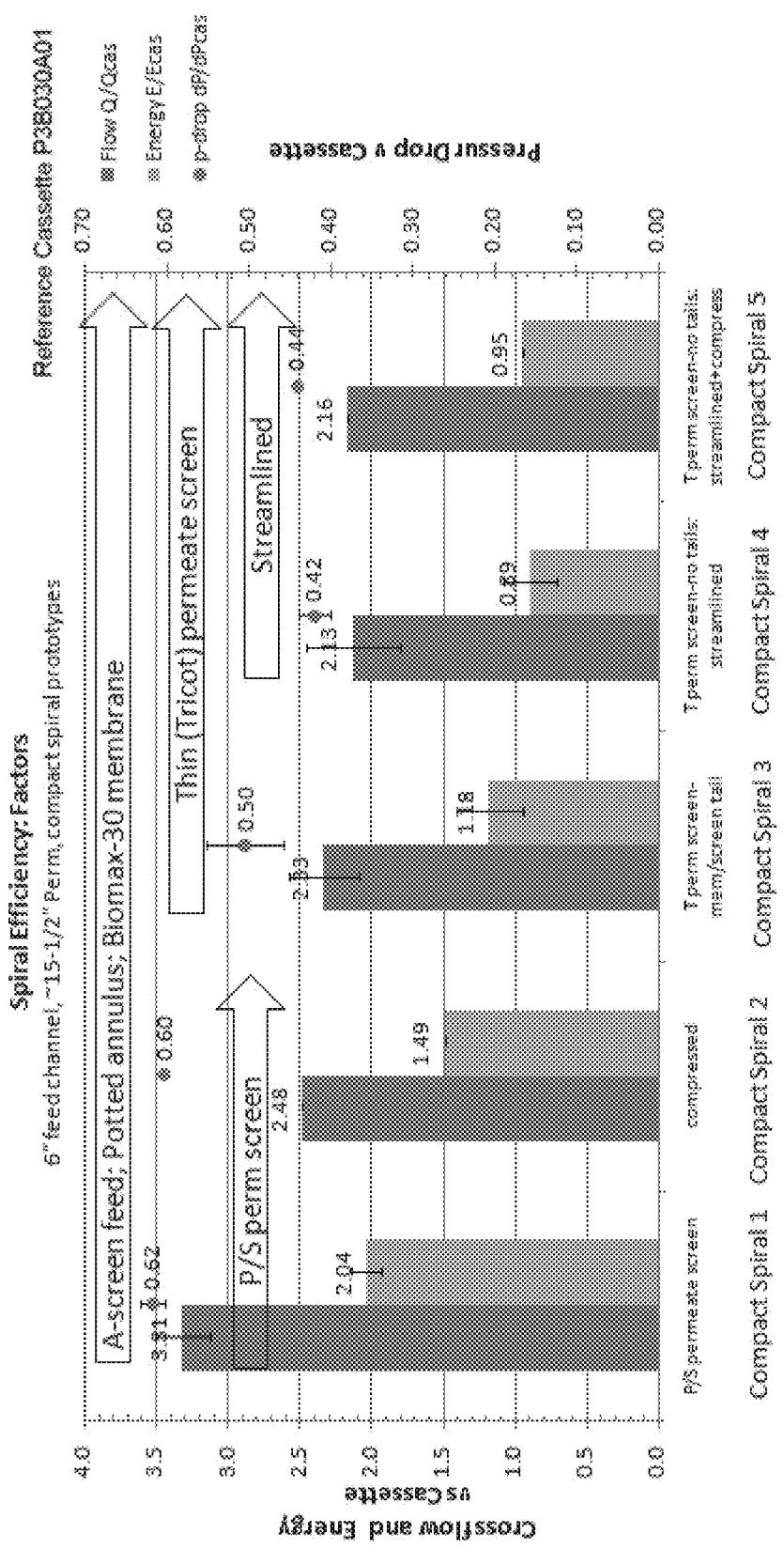
FIG. 18 is a graph showing the effect of different construction factors on the efficiency of spiral-wound filters.

FIG. 18 shows the relative cross-flow, pressure drop, and energy required to achieve the same flux as the reference cassette (Pellicon® 3 mini-cassette with Biomax®-30 membrane, P3B030A01). As may be seen from a comparison between Spirals 1 and 2 in FIG. 18, compression of the filter element improves efficiency with little reduction in pressure drop. Additional efficiency gains were obtained with the use of a thinner permeate screen, even without compression, as may be seen in Spirals 3 and 4, where both pressure drop and energy consumption were decreased. Efficiency of the thin permeate screen prototypes was further improved by streamlining the device through the elimination of membrane and screen tails, as indicated with Spiral 4. Compression of a streamlined, thin permeate screen prototype did not gain any additional efficiencies.

Figure 19:
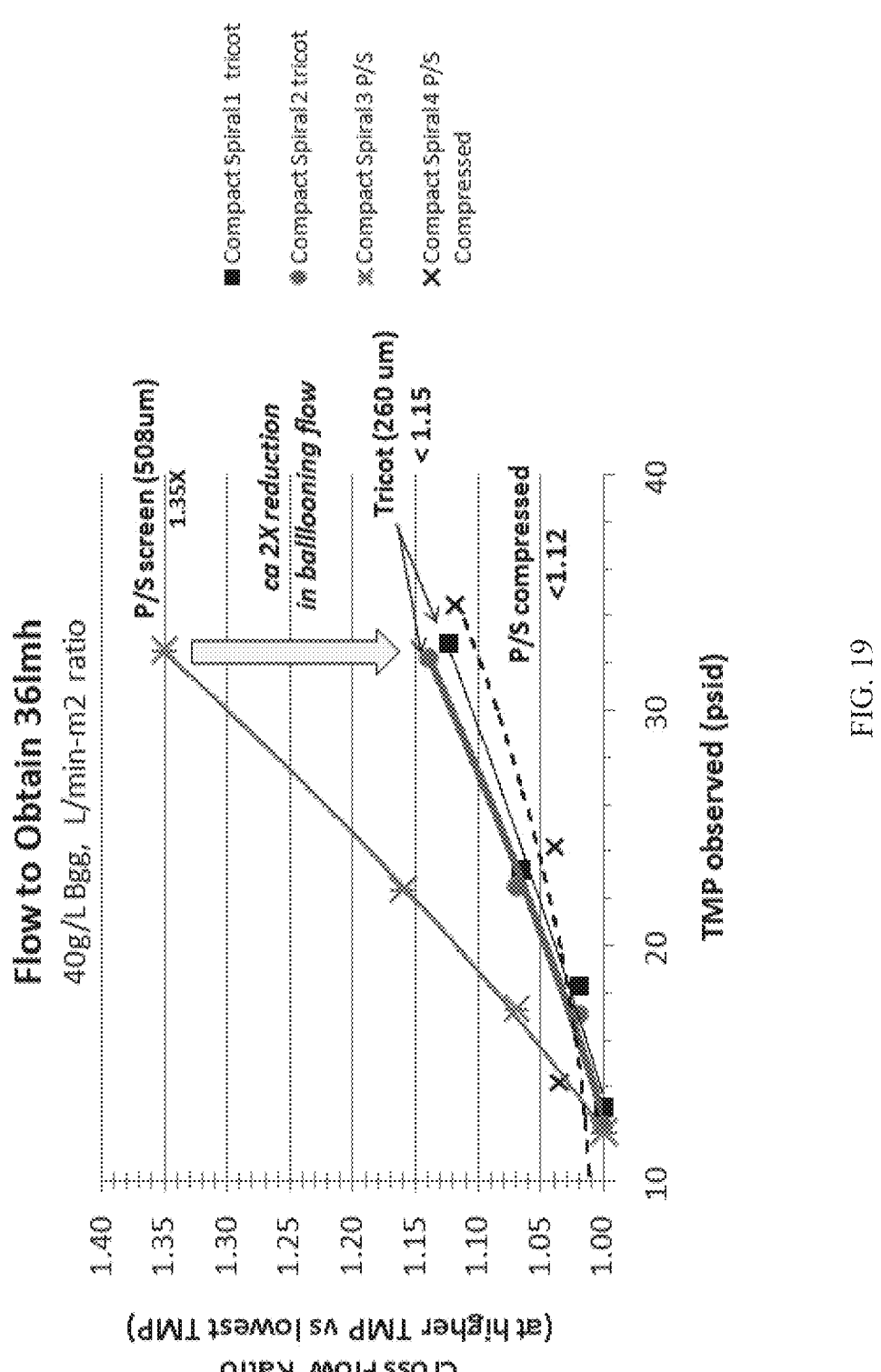
FIG. 19 is a graph of cross flow ratio versus trans membrane pressure (TMP) required in a spiral-wound filter to obtain 36 lmh.

FIG. 19 shows the benefit of using a thinner permeate channel, either by spiral compression or by use of a thinner feed screen. As indicated in FIG. 19, a 2× reduction in ballooning flow was observed between Spiral 1 (uncompressed P/S screen) and Spirals 3, 4, and 5.

Compact spirals described in Examples 2-12 were built with similar efficiency features to compact spiral 4 in FIG. 18, including turbulence-promoting feed screens appropriate to the membranes, a membrane fold offset to minimize membrane tail (streamlined), potted annulus, and tricot screens in the permeate channels.

Example 2: Series Operation of Two 6" Compact Spiral-Wound Filter Elements

In this experiment, 6" long Biomax®-30 spiral prototypes of the present invention were tested to determine the flux and pressure drop as a function of the average cross flow rate. Two 6" spiral prototype sub-elements were placed in series to form each 12" spiral-wound prototype element. For comparison, a reference cassette (Pellicon® 3 mini-cassette with Biomax®-30 membrane, 0.11 m², P3B030A01) and a conventional spiral-wound filter (12.5" Prep/Scale spiral filter, 0.54 m², CDUF006TT) were also tested under the same conditions. All samples were tested using a 40 g/L±2 g/L bovine gamma globulin (Bgg) solution of phosphate buffered saline at 23° C.

Cassette-like performance was achieved by connecting two of the 6" long spiral prototypes in series. As shown in FIG. 20, the prototype compact spirals (Compact Spiral Series 1 and 2) achieved double the flux of the comparative conventional spiral-wound filter and 80% of the flux performance of the reference cassette with a lower pressure drop.

Example 3: High-Turbulence-Promoting Feed Screen

Figure 21:
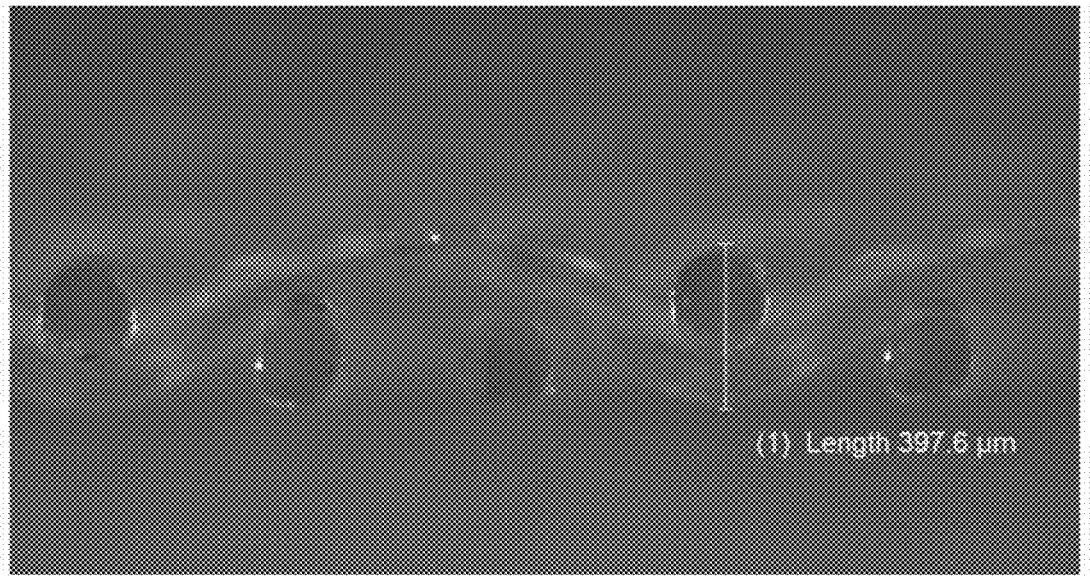
FIG. 21 is an image of an unaltered, non-calendared a-screen feed screen.
Figure 22:
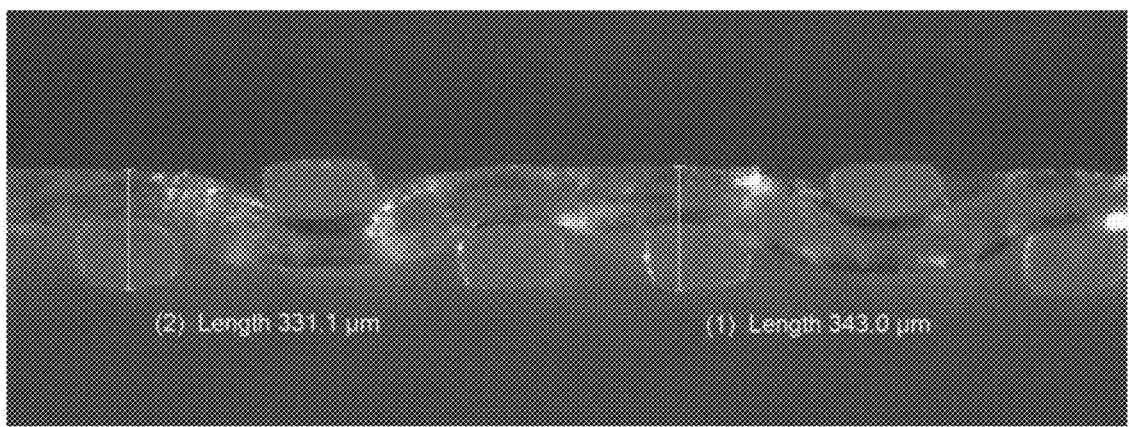
FIG. 22 is an image of a modified a-screen feel screen that has been calendared to remove tangents and reduce screen height.

In this experiment, a feed screen was made to mimic the feed channel geometry expected under cassette-like compression in of the Pellicon® 3 Biomax®-30 cassette filter with a high turbulence-promoting feed screen (a-screen). The channel height after cassette compression was estimated as the feed screen height less two times the imprint depth of the a-screen into the Biomax®-30 membrane. A feed screen was created by hot roll calendaring an a-screen through heated wringers to melt down the tangents on the face of the screen and to create a feed screen with a final height of about 340 μm. The original, non-calendared screen, which had a measured height of 397.6 μm, is shown in FIG. 21 (marked "length" in FIG. 21) and the final calendared a-screen, which had measured heights of 331.1 and 343.0 μm in two locations, is shown in FIG. 22 (marked "length" in FIG. 22).

Figure 23:
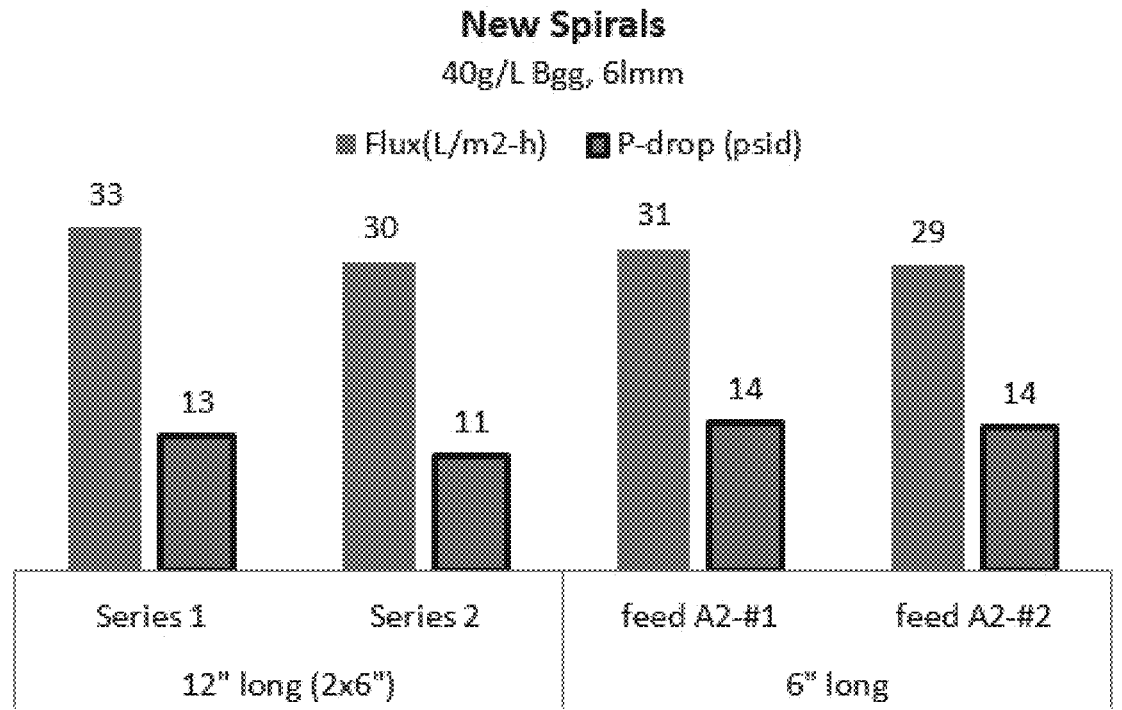
FIG. 23 is a graph of permeate flux and pressure drop of embodiments of the present invention, including a 12" spiral-wound filter element (formed from two 6" spiral-wound filter elements and having a-screen for feed spacer) and a 6" spiral-wound filter element (having a calendared a-screen for a feed spacer).
Figure 24:
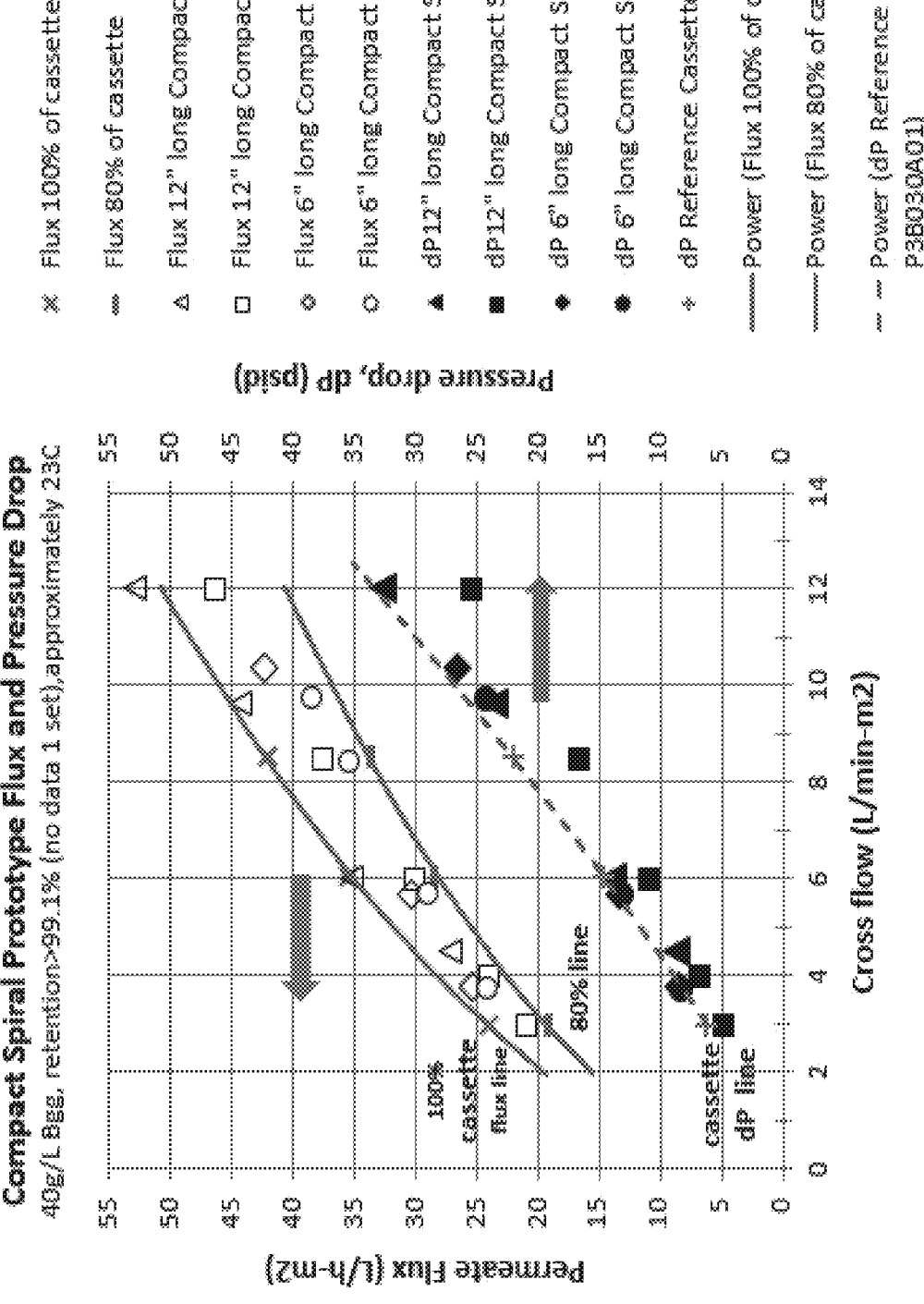
FIG. 24 is a graph of permeate flux versus pressure drop of spiral-wound filter elements in accordance with embodiments of the present invention, including a 12" spiral-wound filter element (formed from two 6" spiral-wound filter elements having a-screens) and a 6" spiral-wound filter element (having a calendared a-screen for feed spacer each with Biomax membrane.

The resulting performance of 6" spiral-wound filters made with the thin feed screen described above was similar to that obtained by 12" long spirals (made from two 6" spirals) having a conventional a-screen feed screen, as shown in FIGS. 23 and 24.

Figure 25:
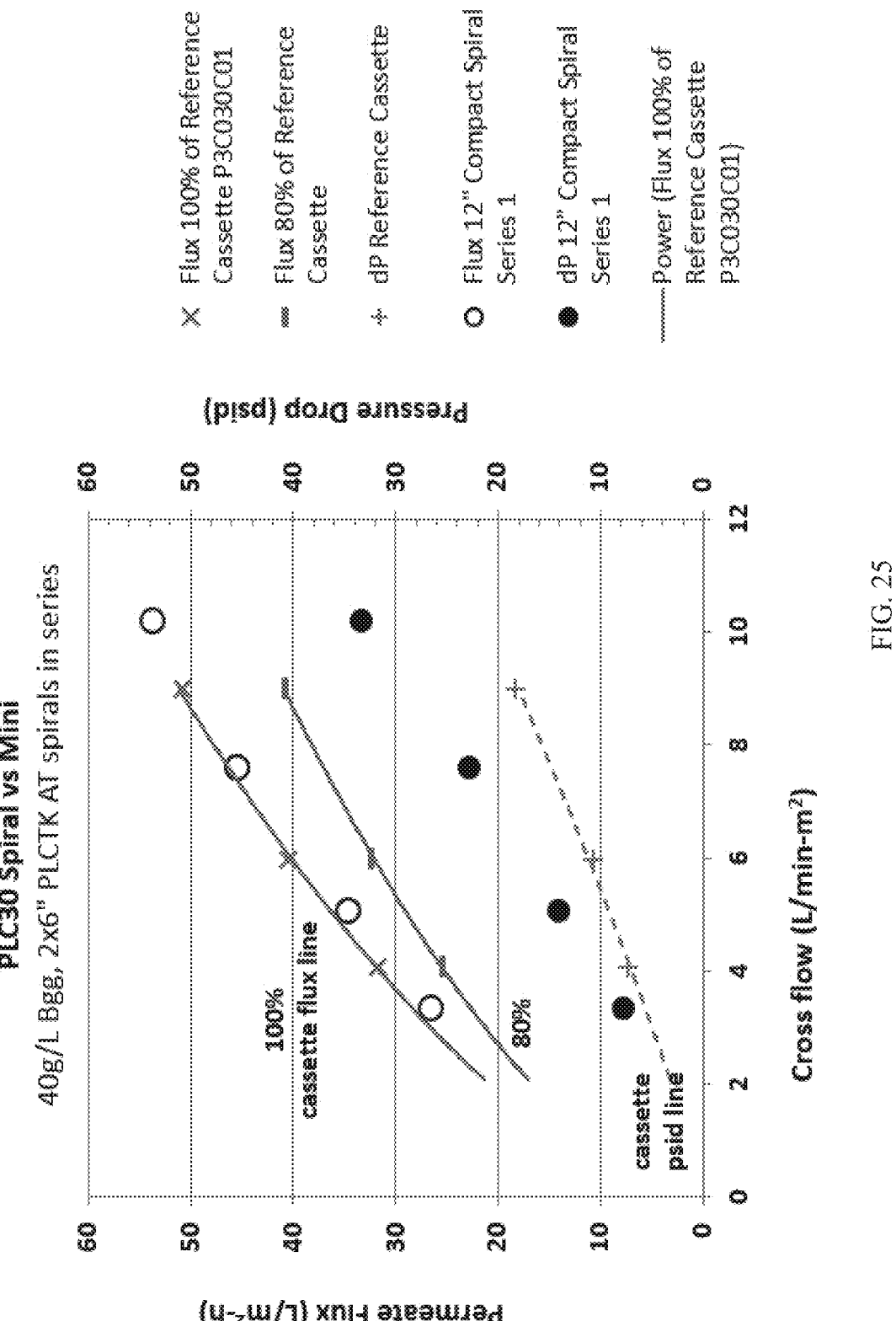
FIG. 25 is a graph of permeate flux versus cross flow of a series of two 6" spiral-wound filter sub-elements (forming a 12" spiral-wound filter element) in accordance with embodiments of the present invention and including PLCTK membrane and a-screen feed screens.
Figure 26:
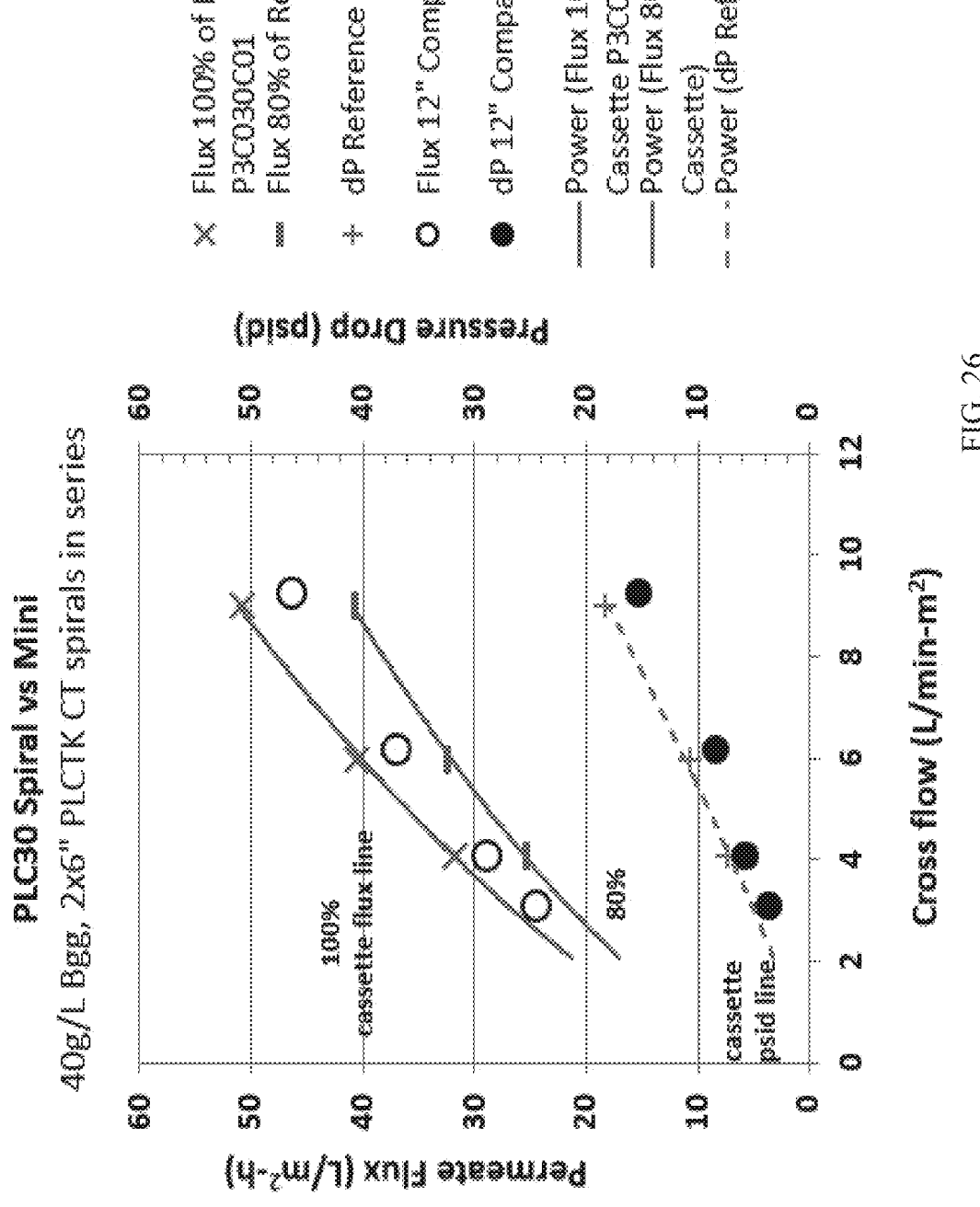
FIG. 26 is a graph of permeate flux versus cross flow of a series of two 6" spiral-wound filter sub-elements (forming a 12" spiral-wound filter element) in accordance with embodiments of the present invention and including PLCTK membrane and c-screen feed screens.

Example 4: Two Compact Spiral-Wound Filter Elements in Series with Ultracel®-30 Membrane In this experiment, the development of a compact, efficient spiral-wound filter element using an Ultracel® 30 membrane (as opposed to the Biomax®-30 membranes of the previous Examples) was evaluated. FIG. 25 shows the results of a compact spiral incorporating an a-screen feed channel spacer. It was found that the a-screen feed screen was too tight, resulting in good flux but an unacceptably high pressure drop. FIG. 26 shows the result of a compact spiral incorporating a c-screen feed channel spacer, which is thicker and more open than an a-screen feed channel spacer. The c-screen prototype generated an acceptable flux and pressure drop, providing cassette-like performance.

Example 5: Operation of One 12.5" Compact Spiral-Wound Filter Elements with Biomax®-30 Membrane In this experiment, a spiral-wound filter element made with the standard feed screen for a Biomax®-30 membrane was made longer, to preclude the need to run two 6" spiral-wound filter elements in series in order to obtain cassette-like performance. A 12.5" spiral-wound filter element gives about twice the membrane area for a given diameter as compared with a 6" spiral-wound filter element made with the same thin feed screen. There are advantages to providing a larger membrane area in a single spiral-wound filter element while maintaining the same diameter, for example, to reduce connections to scale up a TFF system in size and to reduce the number of parts.

Figure 27:
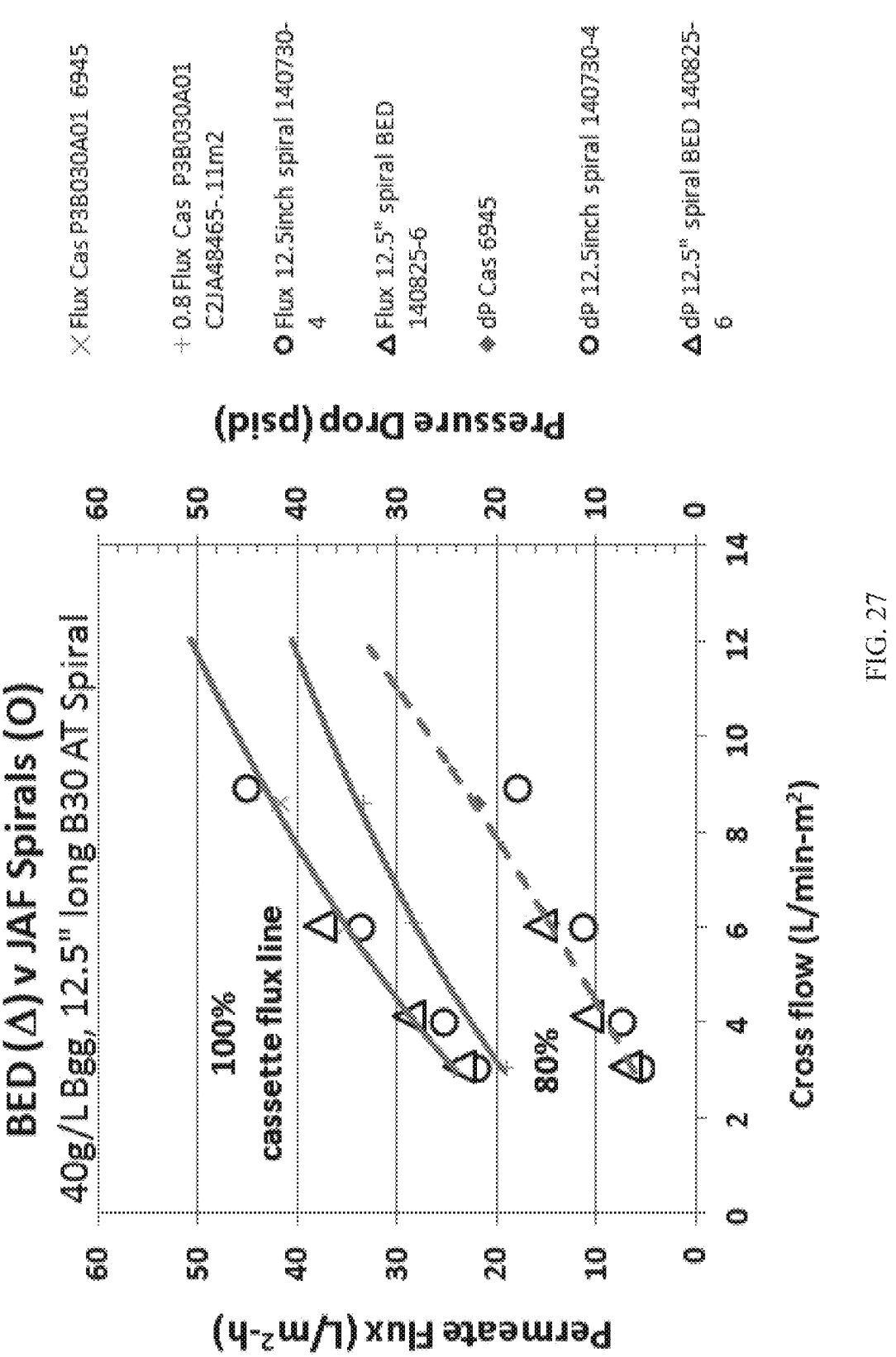
FIG. 27 is a graph of permeate flux versus cross flow of 12.5" spiral-wound filter elements with Biomax-30 membrane in accordance with embodiments of the present invention.

The results are shown in FIG. 27. The 12.5" compact spiral-wound prototypes achieved adequate flux and pressure drop, providing cassette-like performance, similar to the performance of a series of two 6" spirals.

Figure 28:
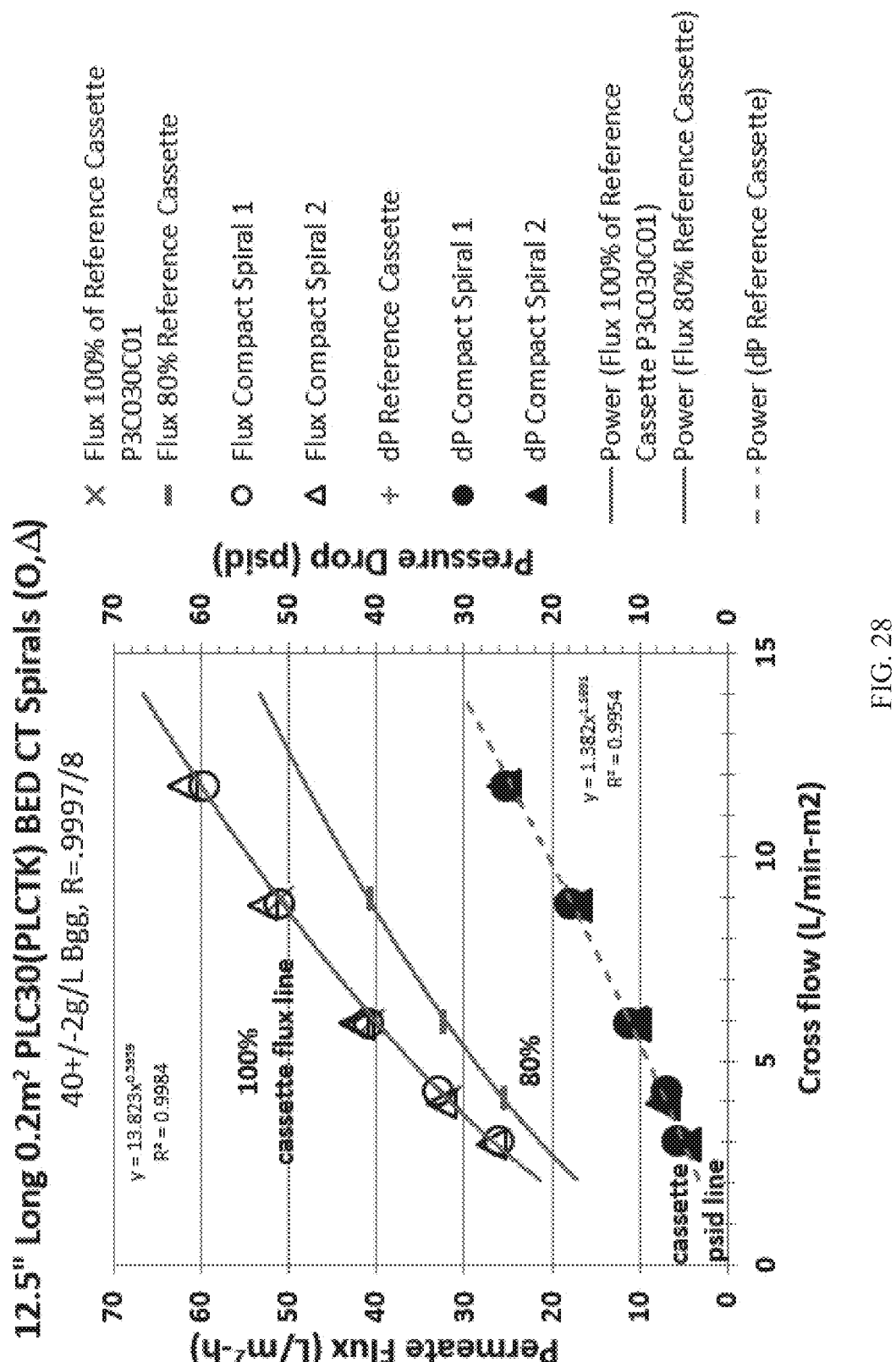
FIG. 28 is a graph of permeate flux versus cross flow of 12.5" spiral-wound filter elements with PLCTK (PLC30) membrane in accordance with embodiments of the present invention.

Example 6: Operation of One 12.5" Compact Spiral-Wound Filter Module with Ultracel®-30 Membrane In this experiment, a spiral-wound filter elements made with a c-screen feed spacers and Ultracel®-30 membranes (PLCTK) were made longer, to preclude the need to run two 6" spiral-wound filter elements in series in order to obtain cassette-like performance. The results are shown in FIG. 28. As in the preceding example, the results indicate adequate flux and pressure drop, providing cassette-like performance, similar to or slightly higher than the series of two 6″ spirals shown in Example 3.

Example 7: Gamma Irradiation for Sterilization Did not Affect Performance of 6″ Long Compact Spiral-Wound Filter Modules with Ultracel®-30 Membranes In this experiment, prototype spiral capsules of this invention were tested for performance on Bgg solution, cleaned with 0.1N NaOH, flushed, subjected to 25 kGy gamma irradiation (a generally accepted low-end sterilization dose), and then tested on Bgg again. There is value in pre-sterilizing devices for single-use applications; for example, they don't need to be sanitized before use, saving time, reducing cost, and reducing sanitizer waste. Since no preservative is required after pre-sterilizing, less flus volume may be required. Gamma irradiation is the current gold standard for sterilization procedures due to its excellent penetration through most samples. However, gamma irradiation can affect the materials of construction, as well as the bioburden target species.

Performance of prototype modules before and after irradiation are shown in FIG. 29. Cassette-like performance was obtained in both samples. The flux did not decrease and pressure drop was maintained in the samples following irradiation.

Example 8: Operation of 6″ Long Compact Spiral-Wound Filter Modules with In-Situ Ultracel®-100 Membranes Cross-linking solution was circulated at a target concentration and temperature through a prototype spiral-wound filter module to convert Ultracel®-100 membrane to Ultracel®-30 membrane. This procedure may be useful to produce a potentially stronger version of Ultracel®-30 membrane that is not available in roll stock.

Figure 30:
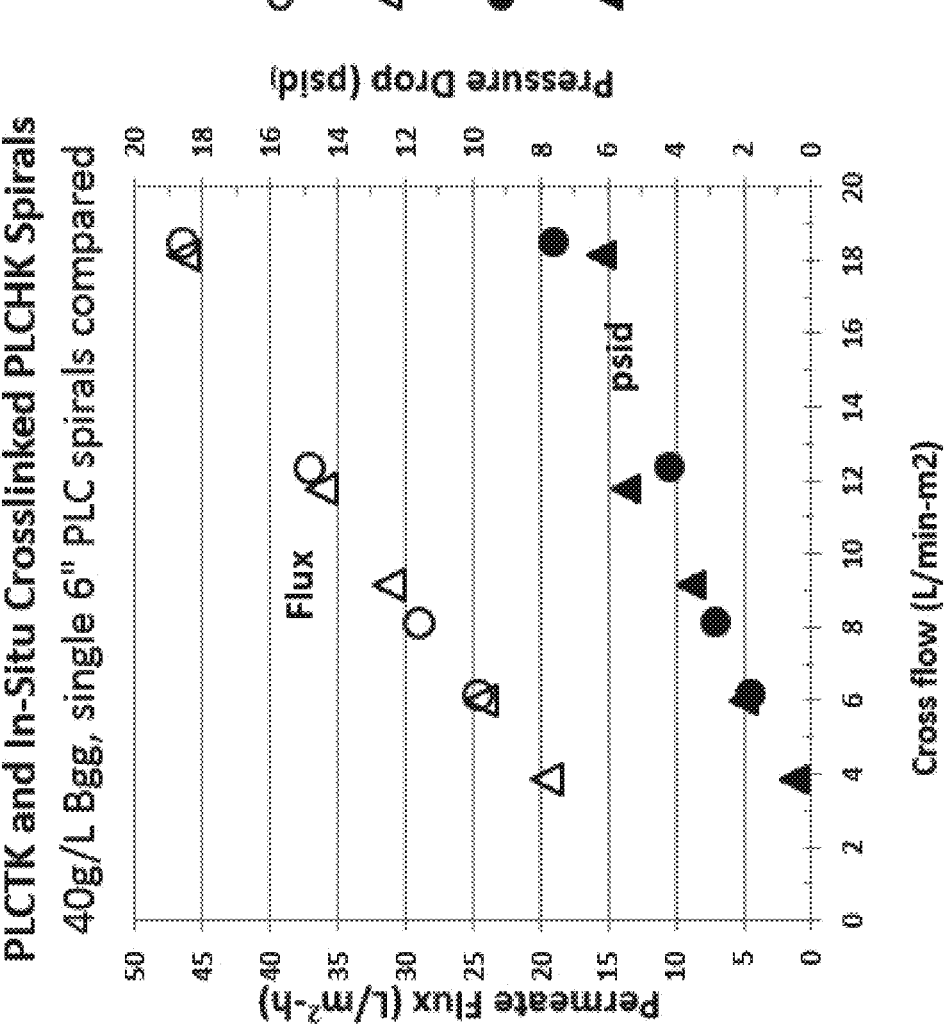
FIG. 30 is a graph of permeate flux versus cross flow of spiral-wound filter elements including a 6" PLCTK (nominal 30 kD membrane), and a 6" cross-linked Ultracel® 100 membrane (PLCHK), to produce a cross-linked 30 kD membrane in accordance with embodiments of the present invention.

Since only one 6″ cross-linked Ultracel®-100 spiral-wound filter element was available, it was compared with one 6″ Ultracel®-30 spiral-wound filter element that was previously tested in series and that showed cassette-like performance. The results are shown in FIG. 30. The cross-linked version of an Ultracel®-100 membrane performed almost the same as the compact spiral with rollstock Ultracel®-30 membrane, with slightly lower retention.

Example 9: A Scaled Down Compact Spiral-Wound Filter Module

In this experiment, the length of spiral leaf (permeate envelope) was shortened to make a scaled-down compact spiral-wound filter module having less area for the same feed channel length, for comparison with a standard reference cassette size of 0.11 m², and to allow ultrafiltration of smaller volumes of feed solution.

Figure 31:
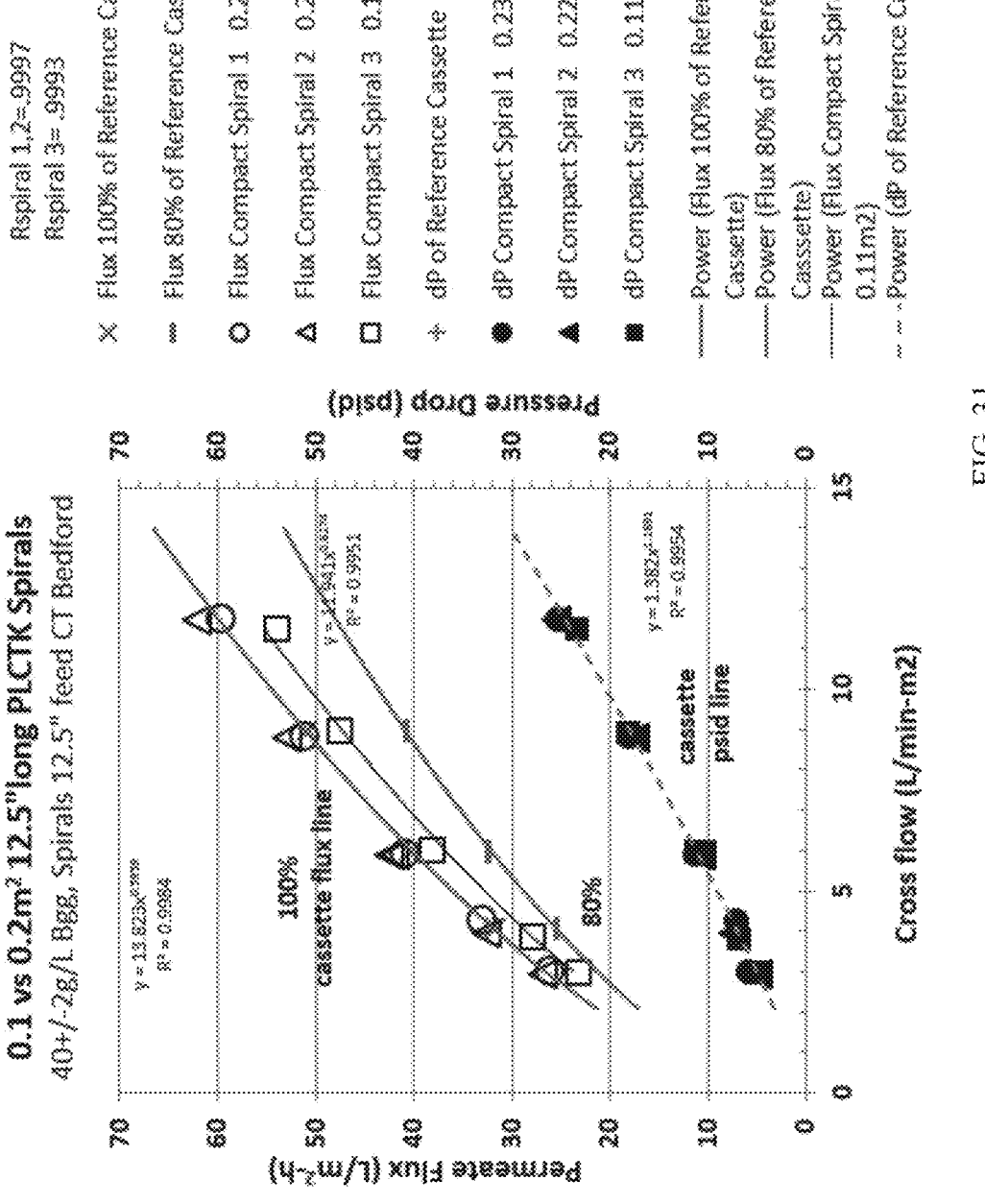
FIG. 31 is a graph of permeate flux versus cross-flow of single 12.5" long spiral-wound filter element with 0.22 m$^2$ or scaled down 0.11 m$^2$ sizes in accordance with embodiments of the present invention.

Ultracel®-30 TFF devices were evaluated, including the reference Pellicon® 3 cassette (P3C030C01), the 0.22 m² and 0.11 m² 12.5″ long prototype spiral-wound filter modules. The results are shown in FIG. 31. The scaled-down prototype spiral-wound filter module, Compact Spiral 3 (0.11 m²) had cassette-like performance, although mass transfer limited flux was about 10% lower than that of the large area (0.22 m²) prototypes, Compact Spirals 1 and 2.

Example 10: 12.5″ Long Compact Spiral-Wound Filter Modules with Ultracel®-30 Membrane and Alternate Material Feed Screen after Gamma and Dimethylacetamide (DMAc) Exposure The feed screen is an important factor in the level of extractables from a device subject to gamma irradiation due to the high wetted surface area. Low extractables are preferred for single-use TFF devices to reduce the amount of flushing required and to prevent contamination of the product pool. The baseline feed screen material used in the previous examples (Examples 1-8) is polypropylene (PP), which is known to be attached by gamma irradiation.

In this experiment, a polyester (PET) feed screen, 07-350/34 (PETEX® screen from Sefar, QC, Canada) similar to the c-screen feed spacer was used to preserve the high mass transfer coefficient while potentially decreasing gamma-related extractables.

The results are shown in FIG. 32. The PET feed screen prototypes (Compact Spirals 3 and 4) demonstrated cassette-like performance with similar Bgg retention as Compact Spirals 1 and 2 having PP feed screens.

Example 11: Batch Concentration of Bgg Solution Using a 30 kD Regenerated Cellulose 12.5″ Long Compact Spiral-Wound Filter Module In this experiment bovine gamma globulin (Bgg) was concentrated from 4 g/L to about 40 g/L, then concentrated from 40 g/L to about 200 g/L, using a retentate recycle tank. Permeate was sent to drain to concentrate and sent back to the recycle tank to stabilize for measurements and sample collection. Cross flow was held at 5 L/min·m² and retentate at 10 psi to mimic typical cassette system operation until the feed pressure reached a maximum of about 60 psi. Cross flow was then decreased to 2.5 L/min·m² until feed pressure again reached 60 psi. The retentate valve was then opened fully and concentration continued until the feed pressure again reached 60 psi.

Figure 33:
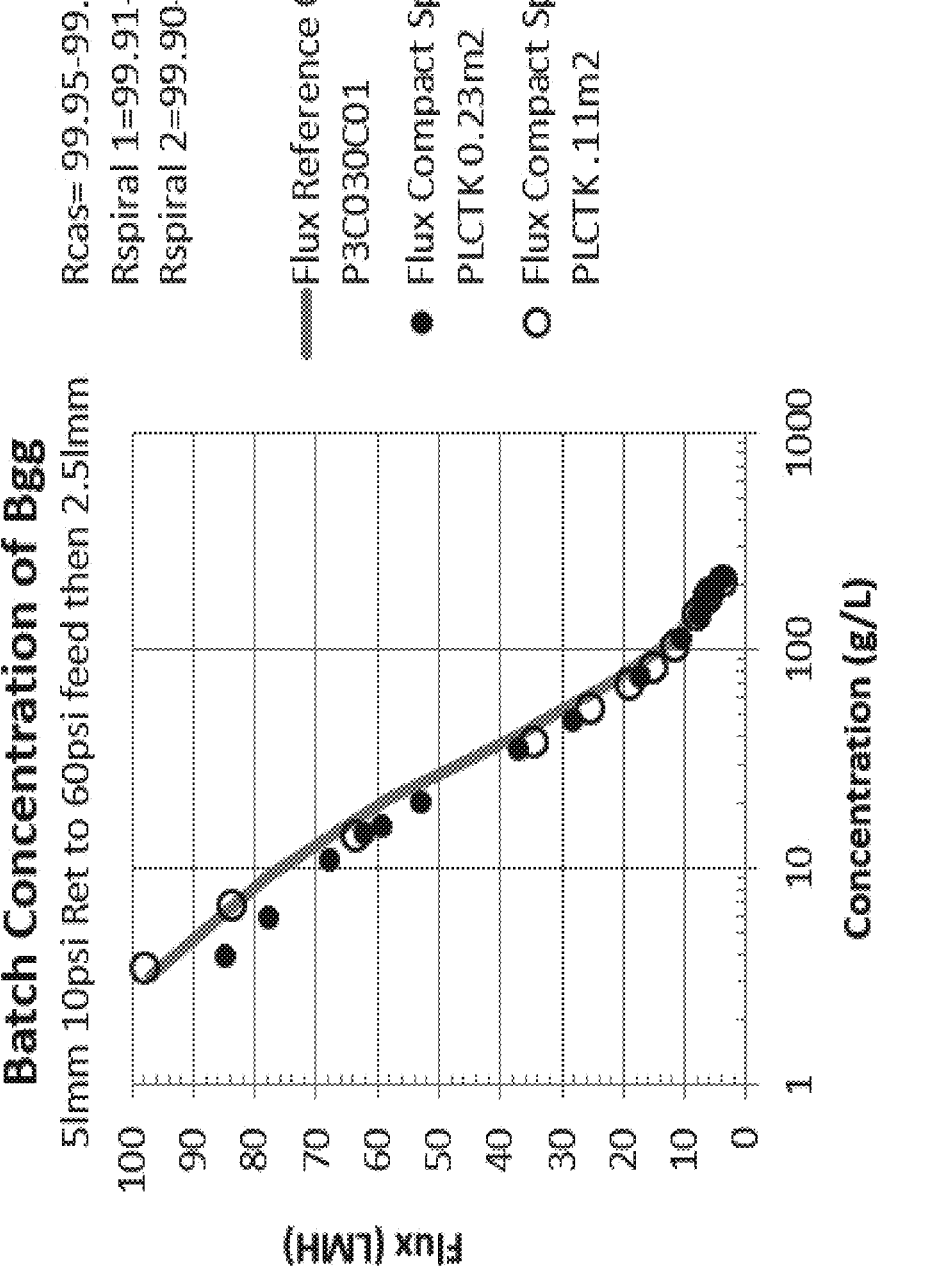
FIG. 33 is a graph of flux versus concentration of Bgg in a batch concentration step using a TFF system having spiral-wound filter elements in accordance with embodiments of the present invention.

FIG. 33 shows a very similar, but slightly lower, flux profile for the compact spiral-wound prototypes of 0.11 m² and 0.23 m² sizes. Flux was noticeably lower for the longer permeate channel prototype (0.23 m²) due to requiring 10 psi retentate. At lower fluxes, the bottleneck disappears and the flux continues at the same level as the shorter permeate channel prototype (0.11 m²). Raising retentate pressure to 15 psi can be sufficient to maintain the flux of the 0.22 m² prototype at the 0.11 m² level up to the highest flux shown in FIG. 34.

Figure 34:
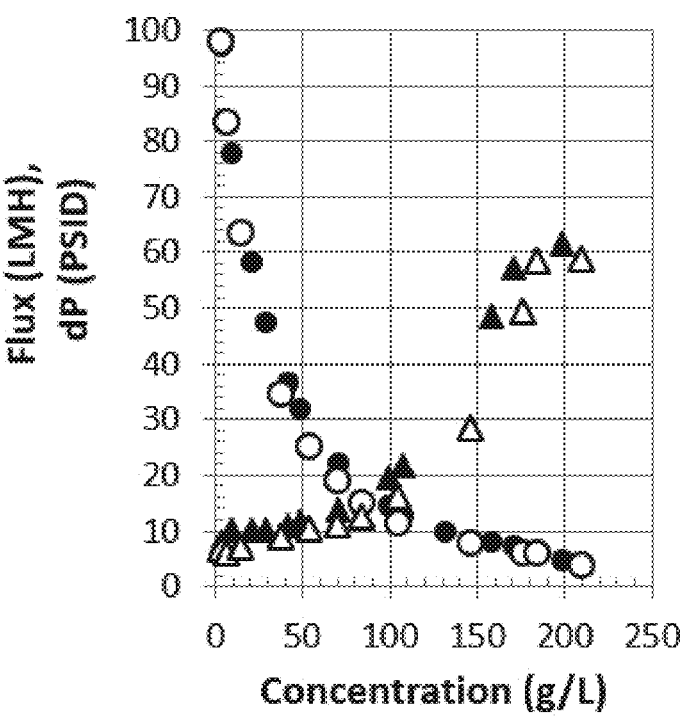
FIG. 34 is a graph of flux and pressure drop versus concentration of Bgg in a batch concentration step using a TFF system having spiral-wound filter elements in accordance with embodiments of the present invention.

FIG. 34 shows a very similar pressure drop profile for the compact spiral-wound prototype (0.11 m²) and flux equivalent to the cassette, even at the highest pressures and pressure drops. While the compact spiral-wound prototype is not being compressed by a holder, it is still able to maintain its feed channel geometry well enough at the highest pressures and pressure drops to match cassette flux.

Example 12: Diafiltration of Model Salt Water Solution with 12.5″ Compact Spiral-Wound Membrane Module with Ultracel®-30 Membrane In this experiment, the salt removal efficiency of a compact spiral-wound module was compared to a cassette using constant volume batch diafiltration. One liter of 5 g/L sodium chloride solution was loaded into the TFF system recirculation tank. Retentate was recycled to the well-mixed recycle tank, while permeate was discharged to a separate collection tank. Purified water was added to the recirculation tank at a target rate equal to the permeate rate, thus maintaining an essentially constant volume in the system.

Figure 35:
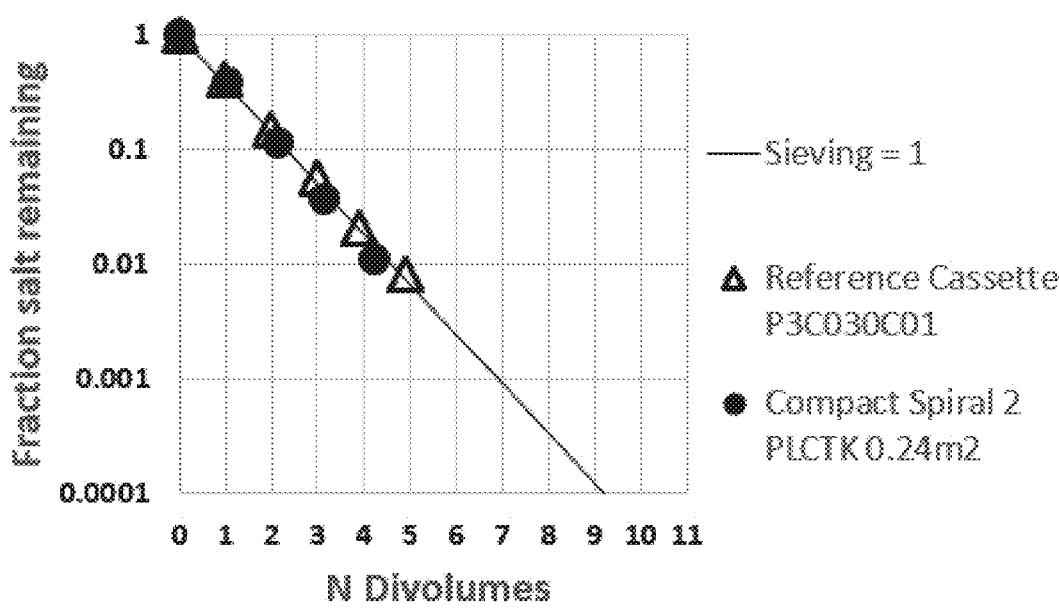
FIG. 35 is a graph of fraction of salt remaining versus number of diafiltration volumes of spiral-wound filter elements in accordance with embodiments of the present invention.
Figure 36:
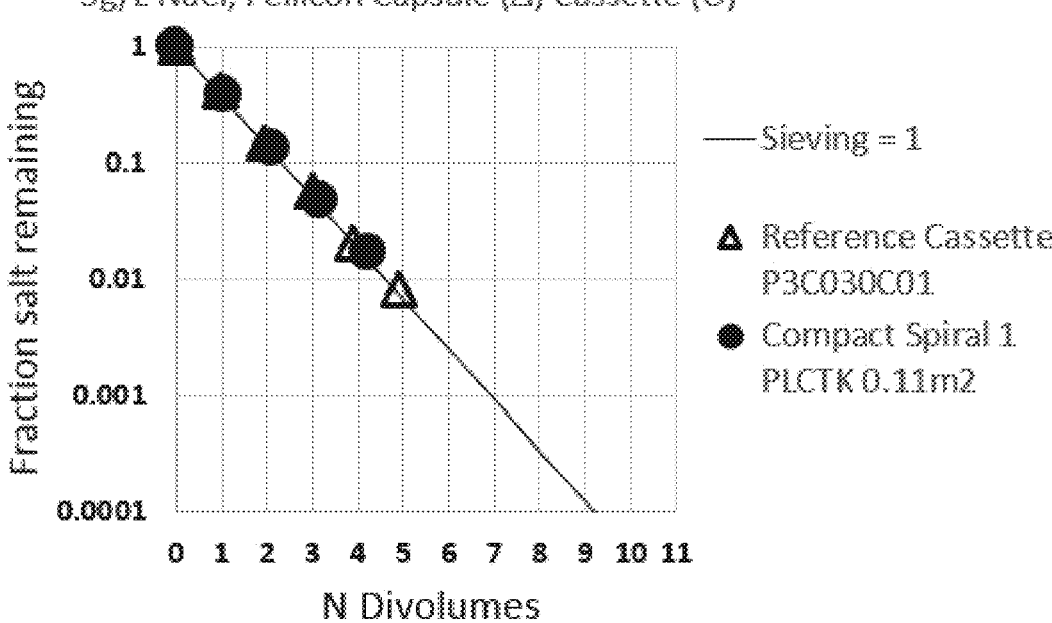
FIG. 36 is a graph of fraction of salt remaining versus number of diafiltration volumes of scaled-down spiral-wound filter elements in accordance with embodiments of the present invention.

The concentration in the tank was monitored with an Oakton conductivity probe. Plotting the natural log of fraction salt remaining versus the number of diafiltration volumes permeated yields a line having a slope that is the negative of the sieving coefficient (i.e., $\ln(C/Co)=-SN$). Plotting fraction salt remaining on a log scale allows an easy assessment of the "log reduction value" of the salt, where 1 log reduction is 10 fold, 2 log reductions is 100 fold, and so forth. FIGS. 35 and 36 show that the compact spirals (Compact Spiral 1 and Compact Spiral 2) gave similar salt reduction rate as the benchmark Pellicon® 3 cassette. This applied to both of the compact spiral prototype designs tested, including the 0.11 m² (short permeate channel, Compact Spiral 2) and the 0.24 m² (long permeate channel, Compact Spiral 1) prototypes.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A filter system, comprising: two or more filter modules, each of the two or more filter modules comprising: a housing, a spiral-wound filter element comprised of a spiral-wound membrane having an interior, said spiral-wound membrane wrapped around and attached to a perforated core having an interior, with the interior of a single leaf spiral-wound membrane in fluid communication with the interior of the perforated core, said interior of the single leaf spiral-wound membrane and interior of the perforated core forming a permeate channel, and a feed stream inlet located on the housing external to the spiral-wound membrane, wherein said two or more modules are in fluid communication in series such that retentate of a first filter module becomes the feed stream of a second filter module or the permeate of the first filter module becomes the feed stream of the second filter module and the feed channel flow cross section changes between at least two successive modules and wherein the outermost feed channel of the spiral-wound filter element is blocked.

2. The filter system of claim 1, wherein feed channel flow cross section successively decreases.

3. The filter system of claim 2, wherein the feed channel height remains the same.

4. The filter system of claim 1, said filter system further comprising a feed screen.

5. The filter system of claim 4, wherein said feed screen is a high turbulence-promoting feed screen.

6. The filter system of claim 1, said filter system further comprising a permeate screen.

7. The filter system of claim 1, wherein the retentate of the first filter module becomes the feed of the second filter module.

8. The filter system of claim 1, wherein the permeate of the first filter module becomes the feed of the second filter module.

9. The filter system of claim 1, wherein said filter system is a tangential flow filter (TFF) system.

10. The filter system of claim 1, wherein said filter system is a single-pass tangential filter (SPTFF) system.

11. The filter system of claim 1, wherein said permeate exits the filter module from the core.

12. The filter system of claim 1, comprising an ultrafiltration membrane, a microfiltration membrane, a reverse-osmosis membrane or a nanofiltration membrane.

13. The filter system of claim 1, further comprising a reservoir for diafiltration solution and a conduit for delivering diafiltration to a feed reservoir.

14. A process for filtering a liquid, comprising: passing a liquid feed through filter system of claim 1, separating the liquid feed into permeate and retentate in the filter system; and recovering the permeate and at least a portion of the retentate from the filter system.

15. The filter system of claim 1, wherein said spiral-wound membrane is a single leaf spiral-wound membrane.

\* \* \* \* \*